United States Patent
Yamaguchi et al.

(10) Patent No.: US 10,139,235 B2
(45) Date of Patent: Nov. 27, 2018

(54) DATA PROCESSING DEVICE, PROGRAM, RECORDING MEDIUM, AND DATA PROCESSING METHOD FOR ASSISTING FORMULATION OF BUNKERING PLAN OF SHIP

(71) Applicant: NIPPON YUSEN KABUSHIKI KAISHA, Tokyo (JP)

(72) Inventors: Atsushi Yamaguchi, Tokyo (JP); Masaharu Urabe, Tokyo (JP); Yoshihiko Maeda, Tokyo (JP); Ryo Kakuta, Tokyo (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/110,193

(22) PCT Filed: Jan. 9, 2014

(86) PCT No.: PCT/JP2014/050204
§ 371 (c)(1),
(2) Date: Jul. 7, 2016

(87) PCT Pub. No.: WO2015/104812
PCT Pub. Date: Jul. 16, 2015

(65) Prior Publication Data
US 2016/0320191 A1    Nov. 3, 2016

(51) Int. Cl.
*G01C 21/20*  (2006.01)
*B63B 49/00*  (2006.01)
*G08G 3/00*  (2006.01)

(52) U.S. Cl.
CPC ............ *G01C 21/203* (2013.01); *B63B 49/00* (2013.01); *G08G 3/00* (2013.01)

(58) Field of Classification Search
CPC ......... G01C 21/203; B63B 49/00; G08G 3/00
(Continued)

(56) References Cited

U.S. PATENT DOCUMENTS

2014/0340241 A1* 11/2014 Smart, Jr. ............... G08G 1/142
340/932.2
2015/0106204 A1    4/2015 Pudar
(Continued)

FOREIGN PATENT DOCUMENTS

| JP | 2003262525 A | 9/2003 |
|---|---|---|
| JP | 2010001114 A | 6/2008 |
| WO | 2013038198 A2 | 3/2013 |

OTHER PUBLICATIONS

International Search Report issued in International Application No. PCT/JP2014/050204, dated Feb. 4, 2014, pp. 1-3.
(Continued)

*Primary Examiner* — Yazan A Soofi
(74) *Attorney, Agent, or Firm* — MKG, LLC

(57) ABSTRACT

A fuel oil information providing server device acquires a reference fuel oil price at bunkering locations on a sailing route specified by a voyage ID input to a terminal device by a user or at which a ship is able to call from the sailing route, and data indicating conditions for correcting the reference fuel oil price, and specifies a fuel oil price obtained by correcting the reference fuel oil price indicated by the acquired data in accordance with the conditions. Fuel oil information providing server device generates display instruction data for instructing that a specified fuel oil price be displayed as a list along with determination rules for a bunkering amount at one or more bunkering locations, and outputs the data to a terminal device that displays information to be used for formulating a bunkering plan.

17 Claims, 15 Drawing Sheets

(58) Field of Classification Search
USPC .......................................................... 701/21
See application file for complete search history.

(56) References Cited

U.S. PATENT DOCUMENTS

2016/0265920 A1* 9/2016 Yamaguchi ............. B63B 49/00
2017/0098375 A1* 4/2017 Smart .................... G08G 1/143

OTHER PUBLICATIONS

Written Opinion issued in corresponding PCT Application No. PCT/JP2014/050204, dated Feb. 4, 2014, pp. 1-3.
Snapshot of Office Action for U.S. Appl. No. 15/033,229; dated May 11, 2018, 26 pages.
Kendall, Scheduling and Bunkering, The Business of Shipping, Cornell Maritime Press, Inc., 1986, pp. 336-351.

* cited by examiner

| DATE | NAME OF BUNKERING LOCATION | TYPE OF OIL | REFERENCE FUEL OIL PRICE (USD/MT) |
|---|---|---|---|
| 2013/10/01 | ROTTERDAM | HFO/500cst | 622 |
| ... | ... | ... | ... |
| ... | ... | ... | ... |

| NAME OF BUNKERING LOCATION | SUPPLIER | TYPE OF OIL | CORRECTION CONDITION |
|---|---|---|---|
| ROTTERDAM | COMPANY A | HFO/500cst | REFERENCE PRICE ROTTERDAM HFO/500cst - USD5 |
| ROTTERDAM | COMPANY B | HFO/500cst | REFERENCE PRICE ROTTERDAM HFO/500cst - USD4 |
| ... | ... | ... | ... |

*FIG. 5*

| DATE | SUPPLIER | NAME OF BUNKERING LOCATION | TYPE OF OIL | FUEL OIL PRICE (USD/MT) |
|---|---|---|---|---|
| 2013/10/01 | COMPANY A | ROTTERDAM | HFO/500cst | 617 |
| 2013/10/01 | COMPANY B | ROTTERDAM | HFO/500cst | 618 |
| ... | ... | ... | ... | ... |

*FIG. 6*

| VOYAGE ID | SHIP NAME | NAME OF SAILING ROUTE |
|---|---|---|
| ... | ... | ... |
| ... | ... | ... |
| ... | ... | ... |

*FIG. 7*

NAME OF SAILING ROUTE "AAA"

| ORDER OF CALLING | PORT NAME | TYPE | TYPE OF OIL |
|---|---|---|---|
| 1 | A | BUNKERING IS POSSIBLE | HFO/380, 500, LSFO |
| 2 | B | BUNKERING IS POSSIBLE | HFO/380, 500, LSFO |
| 3 | C | — | — |
| 4 | X | CALLED ONLY FOR BUNKERING | HFO/180 |
| 5 | D | — | — |
| 6 | E | BUNKERING IS POSSIBLE | HFO/380 |

FIG. 8

SHIP NAME "BBB MARU"   NAME OF SAILING ROUTE "AAA"

| AME OF BUNKERING LOCATION | TYPE OF OIL | BUNKERING AMOUNT DETERMINATION RULES |
|---|---|---|
| ROTTERDAM | HFO/500cst | AN AMOUNT OF 2000 MT SHOULD BE ENSURED AS A REMAINING AMOUNT FOR SAFE ARRIVAL IN SINGAPORE (RETURN PATH). |
| ROTTERDAM | LSFO/S<1.0% | A REMAINING AMOUNT FOR SAILING SECTIONS OF ROUTE (ROUND TRIP) IN ECA SHOULD BE ENSURED. |
| ... | ... | ... |
| ... | ... | ... |

| NAME OF SAILING ROUTE | REMARKS |
|---|---|
| AAA | A BUNKERING LOCATION SHOULD BE DETERMINED AFTER COMPARING PRICES AT ROTTERDAM AND HONG KONG. |
| ... | ... |
| ... | ... |

(b)

| SHIP NAME | REMARKS |
|---|---|
| BBB MARU | WHEN HFO IS BUNKERED, ONLY 380cst IS ALLOWED. (500cst IS NOT ALLOWED.) |
| ... | ... |
| ... | ... |

(c)

| PORT NAME | REMARKS |
|---|---|
| ROTTERDAM | DRAFT 11.5m, AIR DRAFT 10m |
| ROTTERDAM | BERTH SIZE IS SMALL |
| ... | ... |

(d)

| NAME OF BUNKERING LOCATION | SUPPLIER | TYPE OF OIL | SETTLEMENT TERMS | PRICE DETERMINATION DATE | TERMS OF CONTRACT | MINIMUM BUNKERING AMOUNT | SPECIFICATION | OTHERS |
|---|---|---|---|---|---|---|---|---|
| ROTTERDAM | COMPANY A | HFO/380cst | MISCELLANEOUS EXPENSES ARE INCLUDED. | ORDER DATE | CONTRACT BASED ON QUANTITY (10,000MT/MONTH) | 500MT | ISO 2005 RMG 380 | ... |
| ... | ... | ... | ... | ... | ... | ... | ... | ... |
| ... | ... | ... | ... | ... | ... | ... | ... | ... |

FIG. 10

| VOYAGE ID "BA1234" | BA1234 ▼ | SHIP NAME | BBB MARU ▼ | NAME OF SAILING ROUTE | AAA ▼ |

SAILING ROUTE "AAA"
A BUNKERING LOCATION SHOULD BE DETERMINED AFTER COMPARING PRICES AT ROTTERDAM AND HONG KONG.

BBB MARU
WHEN HFO IS BUNKERED, ONLY 380cst IS ALLOWED. (500cst IS NOT ALLOWED.)

| ROTTERDAM | HFO/500cst | AN AMOUNT OF 2000 MT SHOULD BE ENSURED AS A REMAINING AMOUNT FOR SAFE ARRIVAL IN SINGAPORE (RETURN PATH). |
|---|---|---|
| | LSFO/S<1.0% | A REMAINING AMOUNT FOR SAILING SECTIONS OF ROUTE (ROUND TRIP) IN ECA SHOULD BE ENSURED. |
| | LSGO/S<0.1% | A REMAINING AMOUNT FOR SAILING SECTIONS OF ROUTE (ROUND TRIP) IN THE AREA DEFINED BY THE EU DIRECTIVE SHOULD BE ENSURED. |
| LE HAVRE | HFO / 500cst | A REMAINING AMOUNT FOR SAFE ARRIVAL IN LE HARVE (RETURN PATH) SHOULD BE ENSURED UNDER A CONDITION THAT THE REMAINING AMOUNT CANNOT EXCEED 8000MT. |

*FIG. 14*

```
                                                              ┌A05
┌──────────────────────────────────────────────────────────────┐
│ ROTTERDAM                                                    │
│ TYPE OF OIL: HFO 380cst                                      │
│ SETTLEMENT TERMS: MISCELLANEOUS EXPENSES ARE INCLUDED.       │
│ PRICE DETERMINATION DATE: ORDER DATE                         │
│ TERMS OF CONTRACT: CONTRACT BASED ON QUANTITY (10,000MT/MONTH)│
│ MINIMUM BUNKERING AMOUNT: 500MT                              │
│ SPECIFICATION: ISO2005 RMG 380                               │
│ OTHERS: WHEN A TOTAL AMOUNT OF BUNKERED OIL IS EQUAL TO OR LESS THAN │
│ 499MT, SOME ADDITIONAL MISCELLANEOUS EXPENSES ARE INCURRED.  │
└──────────────────────────────────────────────────────────────┘
```

FIG. 17

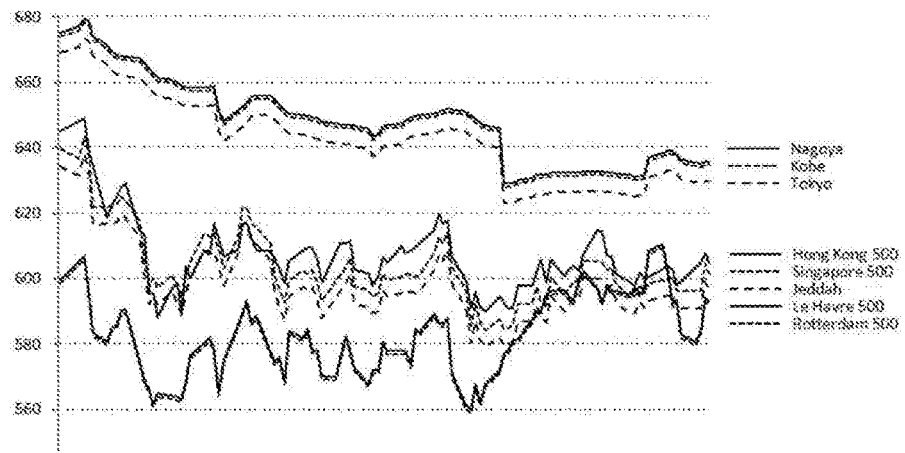

FIG. 18

| TIME RANGE "####-####" | | | SEA AREA "XXXXX" | | |
|---|---|---|---|---|---|
| WIND SPEED | WIND DIRECTION | WAVE HEIGHT | WAVE DIRECTION | TIDE SPEED | TIDE DIRECTION |
| ... | ... | ... | ... | ... | ... |

SHIP NAME "BBB MARU"    NAME OF SAILING ROUTE "AAA"

| ORDER OF CALLING | PORT NAME | TYPE | TYPE OF OIL | TIME OF ARRIVAL AT PORT | TIME OF DEPARTURE FROM PORT |
|---|---|---|---|---|---|
| 1 | A | BUNKERING IS POSSIBLE | HFO/380, 500, LSFO | – | 2013/10/01 12:00 |
| 2 | B | BUNKERING IS POSSIBLE | HFO/380, 500, LSFO | 2013/10/02 13:30 | 2013/10/02 15:30 |
| 3 | C | – | – | ... | ... |
| 4 | X | CALLED ONLY FOR BUNKERING | HFO/180 | ... | ... |
| 5 | D | – | – | ... | ... |
| 6 | E | BUNKERING IS POSSIBLE | HFO/380 | ... | ... |

FIG. 23

| NAME OF BUNKERING LOCATION | TYPE OF OIL | QUANTITY | PURCHASE PRICE |
|---|---|---|---|
| ROTTERDAM | HFO/500cst | - 499MT | REFERENCE PRICE ROTTERDAM HFO/500 cst - USD5 + MISCELLANEOUS EXPENSES (USD10/MT) |
| ROTTERDAM | HFO/500cst | 500 - 1999MT | REFERENCE PRICE ROTTERDAM HFO/500 cst - USD5 |
| ROTTERDAM | HFO/500cst | 2000MT - | REFERENCE PRICE ROTTERDAM HFO/500 cst - USD7 |
| ... | ... | ... | ... |

DATA PROCESSING DEVICE, PROGRAM, RECORDING MEDIUM, AND DATA PROCESSING METHOD FOR ASSISTING FORMULATION OF BUNKERING PLAN OF SHIP

TECHNICAL FIELD

The present invention pertains to a technique for assisting formulation of a bunkering plan of a ship.

BACKGROUND ART

In a vehicle for transporting people, cargo and the like, such as an aircraft, ship and so forth, it is necessary to replenish the vehicle with an appropriate energy source such as fuel oil and electricity to ensure that excessive depletion of the energy source for the vehicle does not occur during travel. Accordingly, when planning a journey an operator of a vehicle is required to estimate an overall amount of an energy source that will be consumed, and determine timings for replenishing the energy source for the vehicle and an amount of the energy source to be replenished.

A variety of systems have been proposed for providing to an operator of a vehicle information for use in facilitating supply of an energy source to the vehicle. For example, in JP2003-262525A, a system for displaying, to a passenger of an electric automobile, information on a charging station at which a battery of the electric automobile is supplied with electricity is proposed. Using the system proposed in JP2003-262525A, an operator of an electric automobile is able to obtain from a map information on their current position relative to a closest charging station, along with a time required to reach the station, a time required for recharging the vehicle, and so forth. Such information is of help when an operator of an electric automobile decides at which charging station and at what timing the electric automobile should be charged.

In a voyage of a ship, a ship operation manager, ship navigator or the like of the ship determines what amount of fuel oil should be supplied to the ship at which port(s) of call to accomplish the voyage safely without the ship encountering a fuel shortage, on the basis of a variety of information such as price of the required type of fuel oil, which changes daily, at each of the ports, estimated value of remaining fuel, which changes in accordance with the voyage of the ship, and the estimated fuel consumption in the voyage planned after the fuel oil is supplied.

In the case of a ship, unlike a standard vehicle or the like, a sailing route is often largely determined in advance. Further, since locations at which a ship can be supplied with fuel oil (bunkering locations) are limited to specific ports, there are fewer bunkering locations than there are petrol stations or charging stations at which a road vehicle can be supplied with an energy source, for example. As such, since there is a limited choice of bunkering locations for supplying a ship with fuel oil, it is necessary for a ship operation manager, ship navigator or the like of a ship to have an accurate bunkering plan of what amount of fuel oil to supply to the ship at which port(s), at the time of planning the entire sailing route.

Conventionally, a ship operation manager, ship navigator or the like of a ship, when formulating a ship bunkering plan, refers to the sailing route of the target ship to ascertain fuel oil prices at bunkering locations at which the ship is scheduled to call or bunkering locations at which the ship is able to call from among fuel prices at a plurality of bunkering locations. This task is complex, and can easily lead to errors.

In view of the foregoing, it is an object of the present invention to provide a means for reducing complex tasks when formulating a ship bunkering plan and to facilitate formulation of accurate bunkering plans, for a ship operation manager, ship navigator or the like of a ship.

SUMMARY

To solve the above-described problem, the present invention provides a data processing device comprising: a sailing route identification data acquisition unit that acquires sailing route identification data identifying a sailing route specified by a user; a fuel oil price data acquisition unit that acquires, for each of one or more bunkering locations at which supplying of fuel oil is possible, fuel oil price data indicating fuel oil prices at bunkering locations; a display instruction data generation unit that generates display instruction data for instructing display of fuel oil prices at each of one or more bunkering locations indicated by the fuel oil price data; and a display instruction data output unit that outputs the display instruction data to a display device.

In the above-described data processing device, a configuration may be adopted in which the data processing device comprises: a reference fuel oil price data acquisition unit that acquires, for each of the one or more bunkering locations, reference fuel oil price data indicating a fuel oil price that serves as a reference at the bunkering locations; a correction conditions data acquisition unit that acquires, for at least one of the one or more bunkering locations, correction conditions data indicating conditions for correcting the fuel oil prices that serve as a reference at the bunkering locations to actual fuel oil prices; and a fuel oil price data generation unit that generates fuel oil price data indicating fuel oil prices specified by correcting the fuel oil prices indicated by the reference fuel oil price data in accordance with the corrections conditions indicated by the correction conditions data; wherein the fuel oil price data acquisition unit acquires fuel oil price data generated by the fuel oil price data generation unit.

In the above-described data processing device, a configuration may also be adopted in which the data processing device comprises: a price determination rule data acquisition unit that acquires, for at least one bunkering location from among the one or more bunkering locations, price determination rule data indicating determination rules for actual fuel oil prices at the bunkering locations; wherein the display instruction data generation unit generates display instruction data that instructs display of determination rules for actual fuel oil price indicated by the price determination rule data.

In the above-described data processing device, a configuration may also be adopted in which the data processing device comprises: a bunkering plan data acquisition unit that acquires, for at least one bunkering location from among the one or more bunkering locations, bunkering plan data indicating determination rules for a bunkering amount of fuel oil at the bunkering locations; wherein the display instruction data generation unit generates display instruction data that instructs display of determination rules for a bunkering amount indicated by the bunkering plan data.

In the above-described data processing device, a configuration may also be adopted in which the fuel oil price data acquisition unit acquires, in addition to fuel oil prices at bunkering locations positioned on the sailing route, fuel oil price data indicating fuel oil prices at bunkering locations at which a ship that traverses the sailing route is able to call during a voyage, and the display instruction data generation unit, in addition to fuel oil prices at bunkering locations positioned on the sailing route, generates display instruction data that instructs display of fuel oil prices at bunkering locations at which a ship that traverses the sailing route is able to call during the voyage.

In the above-described data processing device, a configuration may also be adopted in which the data processing device comprises: a bunkering location position data acquisition unit that acquires bunkering location position data indicating positions of a plurality of bunkering locations; and a bunkering location specification unit that specifies, on the basis of the bunkering location position data, bunkering locations that are not positioned on the sailing route and at which a ship that traverses the sailing route is able to call during the voyage; wherein the fuel oil price data acquisition unit acquires fuel oil price data indicating fuel oil prices at the bunkering locations specified by the bunkering location specification unit at which a ship that traverses the sailing route is able to call during the voyage.

In the above-described data processing device, a configuration may also be adopted in which the data processing device comprises: a fuel oil price data storage unit that stores fuel oil price data acquired by the fuel oil price data acquisition unit in association with time and date data indicating time and date at which fuel oil were sold at fuel oil prices indicated by the fuel oil price data; wherein the display instruction data generation unit generates display instruction data that instructs display of time-series variations in fuel oil prices at bunkering locations positioned on the sailing route indicated by a plurality of pairs of fuel oil price data and time and date data stored by the fuel oil price data storage unit.

In the above-described data processing device, a configuration may also be adopted in which the data processing device comprises: a remaining oil amount data acquisition unit that acquiring, for each of one or more fuel oil tanks provided on a ship that traverses the sailing route, remaining oil amount data indicating a currently remaining fuel oil amount stored in the fuel oil tank; wherein the display instruction data generation unit generates display instruction data that instructs display of a remaining oil amount indicated by the remaining oil amount data.

In the above-described data processing device, a configuration may also be adopted in which the data processing device comprises: a current position data acquisition unit that acquires current position data indicating a current position of a ship that traverses the sailing route; wherein the display instruction data generation unit generates display instruction data that instructs display of a position indicated by the current position data.

In the above-described data processing device, a configuration may also be adopted in which the data processing device comprises: a weather and marine data acquisition unit that acquires weather and marine data indicating weather and/or marine conditions encountered by a ship that traverses the sailing route; wherein the display instruction data generation unit generates display instruction data that instructs display of weather and/or marine conditions indicated by the weather and marine data.

In the above-described data processing device, a configuration may also be adopted in which the data processing device comprises: a bunkering amount data acquisition unit that acquires bunkering amount data indicating a bunkering amount specified by a user for one of the bunkering locations for which fuel oil price data is acquired by the fuel oil price data acquisition unit; and a price calculation unit that calculates, on the basis of the fuel oil price data and the bunkering amount data for the one of the bunkering locations, a purchase price of fuel oil for a bunkering amount indicated by the bunkering amount data for the one of the bunkering locations; wherein the display instruction data generation unit generates display instruction data that instructs display of the purchase price.

In the above-described data processing device, a configuration may also be adopted in which the data processing device comprises: a per-route formulation rule data acquisition unit that acquires per-route formulation rule data indicating rules on formulating a bunkering plan for a sailing route identified by the sailing route identification data; wherein the display instruction data generation unit generates display instruction data that instructs display of rules indicated by the per-route formulation rule data.

In the above-described data processing device, a configuration may also be adopted in which the data processing device comprises: a per-port formulation rule data acquisition unit that acquires, for each of at least one of one or more bunkering locations positioned on a sailing route identified by the sailing route identification data, per-port formulation rule data indicating rules for formulating a bunkering plan; wherein the display instruction data generation unit generates display instruction data that instructs display of rules indicated by the per-port formulation rule data.

In the above-described data processing device, a configuration may also be adopted in which the data processing device comprises: a ship identification data acquisition unit that acquires ship identification data identifying a ship specified by a user; and a per-ship formulation rule data acquisition unit that acquires, for a ship identified by the ship identification data, per-ship formulation rule data indicating rules for formulating a bunkering plan; wherein the display instruction data generation unit generates display instruction data that instructs display of rules indicated by the per-ship formulation rule data.

The present invention provides a program for causing a computer to execute: a process for acquiring sailing route identification data identifying a sailing route specified by a user; a process for acquiring, for each of one or more bunkering locations at which supplying of fuel oil is possible, fuel oil price data indicating fuel oil prices at bunkering locations; a process for generating display instruction data for instructing display of fuel oil prices at each of one or more bunkering locations indicated by the fuel oil price data; and a process for outputting the display instruction data to a display device.

The present invention provides a computer-readable recording medium that continuously records a program for causing a computer to execute: a process for acquiring sailing route identification data identifying a sailing route specified by a user; a process for acquiring, for each of one or more bunkering locations at which supplying of fuel oil is possible, fuel oil price data indicating fuel oil prices at bunkering locations; a process for generating display instruction data for instructing display of fuel oil prices at each of one or more bunkering locations indicated by the fuel oil price data; and a process for outputting the display instruction data to a display device.

The present invention provides a data processing method comprising: a step in which a data processing device acquires sailing route identification data identifying a sailing route specified by a user; a step in which the data processing device acquires, for each of one or more bunkering locations at which supplying of fuel oil is possible, fuel oil price data indicating fuel oil prices at bunkering locations; a step in which the data processing device generates display instruction data for instructing display of fuel oil prices at each of one or more bunkering locations indicated by the fuel oil price data; and a step in which the data processing device outputs the display instruction data to a display device.

According to the present invention, from among fuel oil prices at a plurality of bunkering locations, the fuel oil prices at bunkering locations on a sailing route specified by a user such as a ship operation manager, a ship navigator or the like are extracted and displayed in list form. Therefore, it is not necessary for a user to conduct a search for fuel oil prices at bunkering locations on a specified sailing route. Thus, according to the present invention, complex tasks in the formulation of a ship bunkering plan are simplified, and a user is able easily to formulate an appropriate bunkering plan.

BRIEF EXPLANATION OF THE DRAWINGS

FIG. 5 is a drawing illustrating the configuration of data used by a fuel oil information providing server device as in one embodiment of the present invention.

FIG. 6 is a drawing illustrating the configuration of data used by a fuel oil information providing server device as in one embodiment of the present invention.

FIG. 7 is a drawing illustrating the configuration of data used by a fuel oil information providing server device as in one embodiment of the present invention.

FIG. 8 is a drawing illustrating the configuration of data used by a fuel oil information providing server device as in one embodiment of the present invention.

FIG. 9 is a drawing illustrating the configuration of data used by a fuel oil information providing server device as in one embodiment of the present invention.

FIG. 10 is a drawing illustrating the configuration of data used by a fuel oil information providing server device as in one embodiment of the present invention.

FIG. 12 is a drawing illustrating an example of information displayed on a screen of a terminal device as in one embodiment of the present invention.

FIG. 13 is a drawing illustrating an example of information displayed on a screen of a terminal device as in one embodiment of the present invention.

FIG. 14 is a drawing illustrating an example of information displayed on a screen of a terminal device as in one embodiment of the present invention.

FIG. 17 is a drawing illustrating an example of information displayed on a screen of a terminal device as in one embodiment of the present invention.

FIG. 18 is a drawing illustrating an example of information displayed on a screen of a terminal device as in one embodiment of the present invention.

FIG. 23 is a drawing illustrating the configuration of data used by a fuel oil information providing server device as in a modified example of the present invention.

DETAILED DESCRIPTION

Exemplary Embodiment

Figure 1:
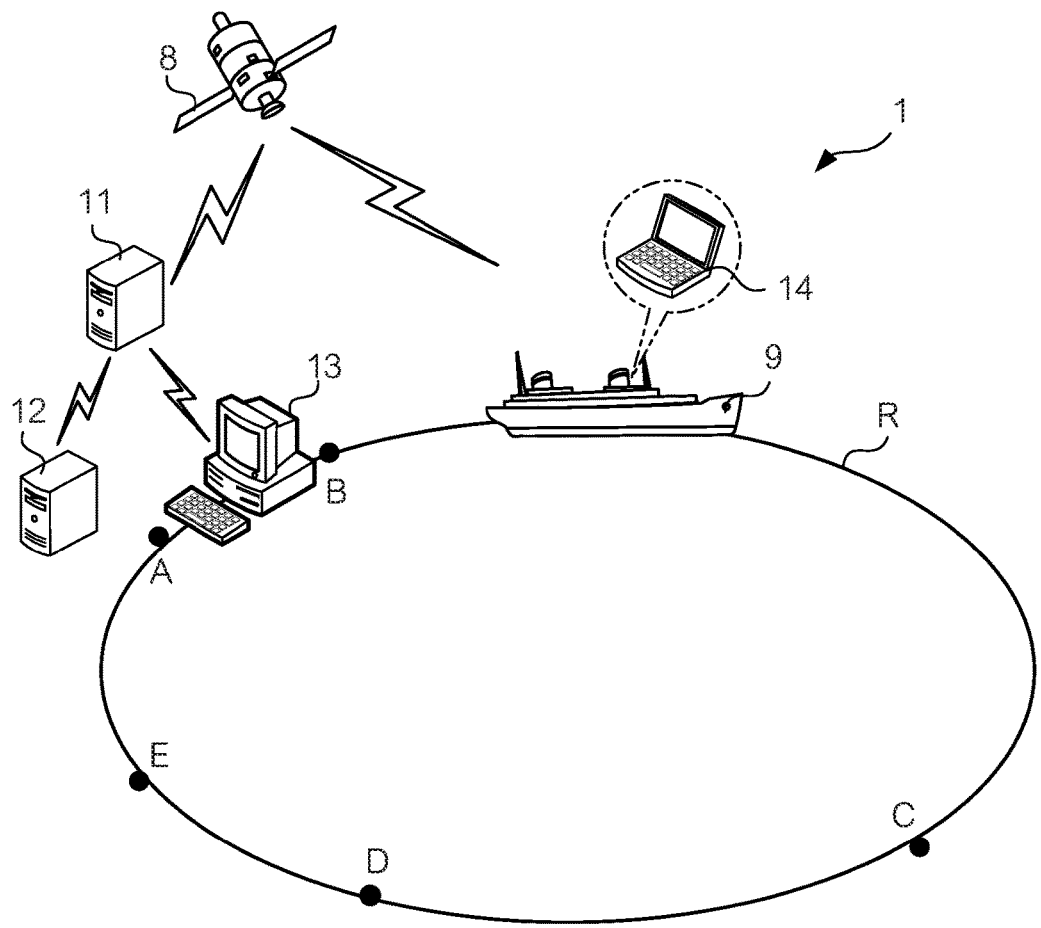
FIG. 1 is a drawing illustrating the overall configuration of a fuel oil information providing system as in one embodiment of the present invention.

The following is an explanation of the configuration and operation of a fuel oil information providing system 1 as in one exemplary embodiment of the present invention. FIG. 1 is a drawing schematically illustrating the overall configuration of fuel oil information providing system 1. Fuel oil information providing system 1 is provided with: a fuel oil information providing server device 11, which is a server device that provides various types of information that serve collectively as determination information when a user such as a ship operation manager, ship navigator or the like of a ship 9 formulates a bunkering plan; a reference fuel oil price data providing server device 12, which is a server device that provides usual fuel oil prices for bunkering locations worldwide, at which ships can be supplied with fuel oil (hereafter referred to as "reference fuel oil price"); a terminal device 13, which is operated by a ship operation manager that manages from land operations of a plurality of ships including ship 9; and a terminal device 14, which is operated by a ship navigator of ship 9. Fuel oil information providing server device 11 and reference fuel oil price data providing server device 12, and reference fuel oil price data providing server device 12 and terminal device 13 perform mutual data communication via a wired network, for example. Fuel oil information providing server device 11 and terminal device 14 perform mutual data communication via a communication satellite 8.

FIG. 1 exemplifies a situation in which ship 9 traverses a sailing route R, which is a round trip sailing route that departs from port A, and sails via ports B, C . . . , before returning to port A.

Figure 2:
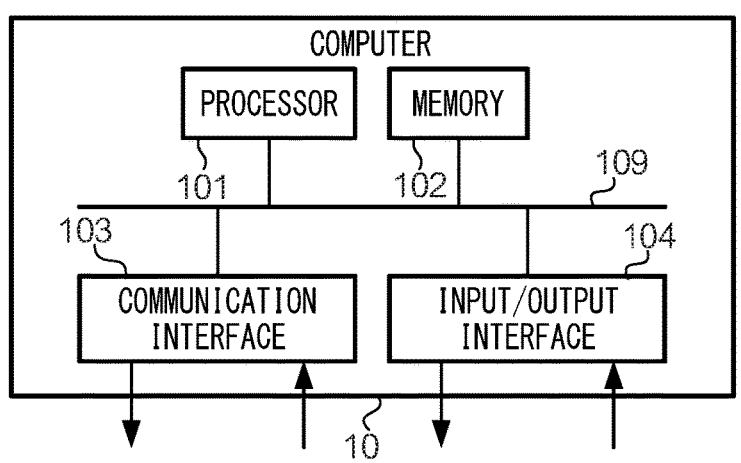
FIG. 2 is a drawing illustrating the configuration of a computer used as hardware in a device provided with a fuel oil information providing system as in one embodiment of the present invention.

The hardware configuration of fuel oil information providing server device 11, reference fuel oil price data providing server device 12, terminal device 13 and terminal device 14 is a general computer provided with a communication unit that performs data communication with other devices. FIG. 2 is a drawing illustrating the configuration of a computer 10 used as hardware in fuel oil information providing server device 11, reference fuel oil price data providing server device 12, terminal device 13 and terminal device 14.

Computer 10 is provided with a processor 101 that performs various operations in accordance with programs such as an OS, application programs and the like, as well as controlling other components, a memory 102 that stores the above-described program and various items of data, a communication interface 103 that is an interface for sending and receiving various types of data to and from other devices, and an input/output interface 104 that is an interface for inputting/outputting various types of data to/from operation devices such as a keyboard, a mouse and the like, a display (display device) and the like. Processor 101, memory 102, communication interface 103 and input/output interface 104 mutually send and receive data via a bus 109.

Since reference fuel oil price data providing server device 12 is a general server device that sends pre-stored data, in accordance with requests from other devices, to devices that are the request destination, explanation of the functional configuration thereof is omitted. Since terminal device 13 is a general terminal device that requests data from a server device, receives data sent from the server device in accordance with the request and performs display in accordance with the received data, explanation of the functional configuration thereof is omitted. Terminal device 14, as described below, is a general terminal device that, in the same way as terminal device 13, requests data from a server device, receives data sent from the server device in accordance with the request and performs display in accordance with the received data, excluding a feature of sending remaining fuel amount data indicating the remaining fuel amount on ship 9 and current position data indicating the current position of ship 9 in accordance with the request data sent from fuel oil information providing server device 11. Therefore, explanation of the functional configuration thereof is omitted. Accordingly, the following explanation relates to the functional configuration of fuel oil information providing server device 11 and operation thereof.

Fuel oil information providing server device 11, as stated previously, is a server device that provides various types of information that serve as determination information when formulating a bunkering plan; fuel oil information providing server device 11 generates display instruction data that instructs display of various types of information such as fuel oil price in accordance with a request from terminal device 13 or terminal device 14, and sends the data to terminal device 13 or terminal device 14, the source of request. To realize such functions, fuel oil information providing server device 11 is provided with the functional configuration illustrated in FIG. 3. That is, computer 10, which constitutes the hardware of fuel oil information providing server device 11, functions as a device provided with the configuration illustrated in FIG. 3 by executing processes according to application programs for fuel oil information providing server device 11 as in the present embodiment.

Fuel oil information providing server device 11 is provided with, as a functional configuration thereof, firstly, a reference fuel oil price data acquisition unit 111 that acquires reference fuel oil price data that indicates reference fuel oil prices. Reference fuel oil price data acquisition unit 111 acquires reference fuel oil price data by: communicating with reference fuel oil price data providing server device 12 using communication interface 103 of computer 10 that constitutes fuel oil information providing server device 11; sending, to reference fuel oil price data providing server device 12, request data for reference fuel oil price data for a fuelling location each time a predetermined time period has passed (for example, once a day at a predetermined time); and receiving reference fuel oil price data sent from reference fuel oil price data providing server device 12 as a response to the request data.

Figures 3, 4:
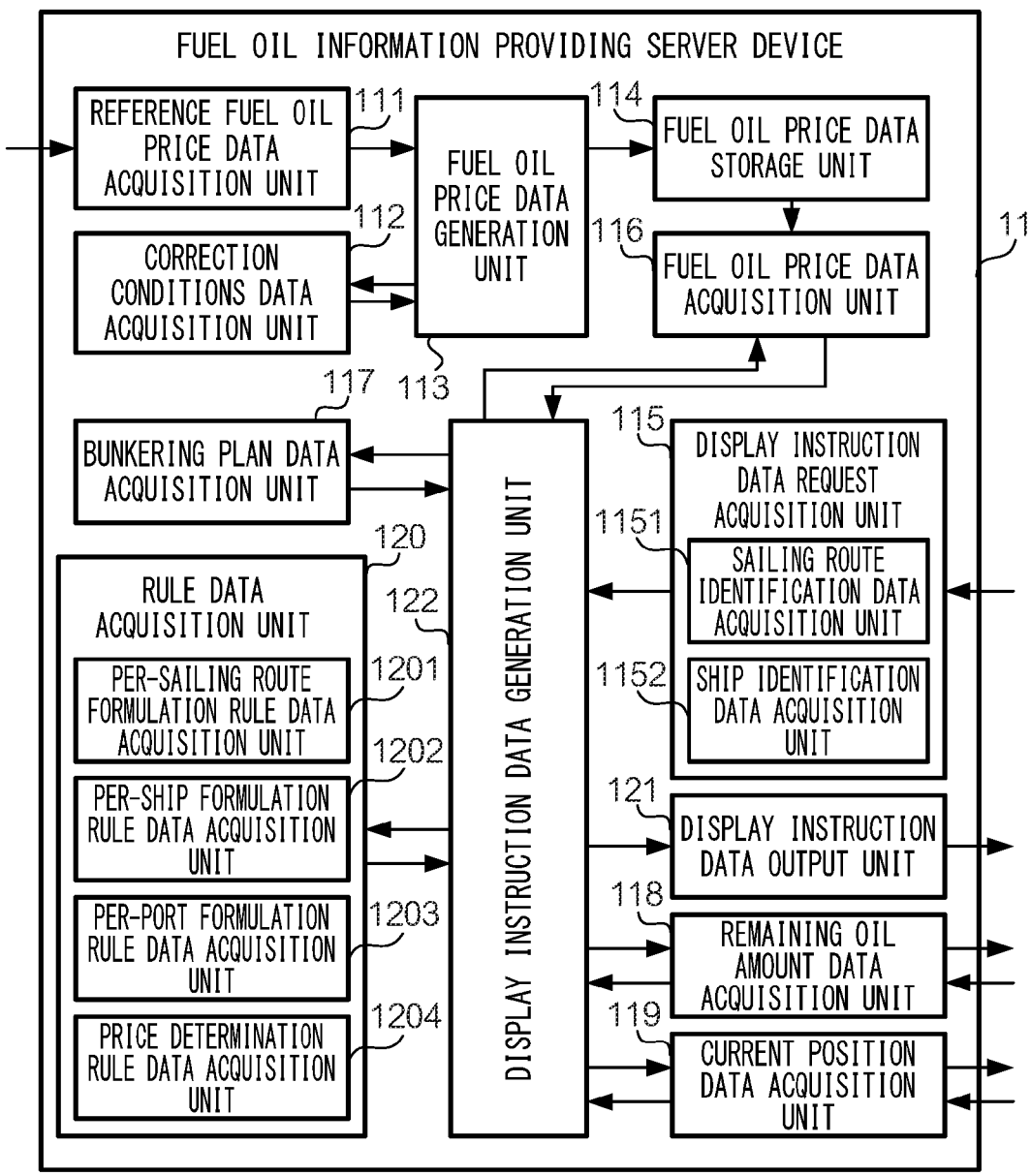
FIG. 3 is a drawing illustrating the functional configuration of a fuel oil information providing server device as in one embodiment of the present invention.
FIG. 4 is a drawing illustrating the configuration of data used by a fuel oil information providing server device as in one embodiment of the present invention.

Reference fuel oil price data providing server device 12 stores a reference fuel oil price database for storing reference fuel oil price data for bunkering locations worldwide to provide reference fuel oil price data in accordance with requests from fuel oil information providing server device 11. FIG. 4 is a drawing exemplifying the data configuration of a reference fuel oil price database. Each of the items of reference fuel oil price data stored in the reference fuel oil price database indicates date, name of bunkering location, type of oil and reference fuel oil price. Date indicates the date corresponding to the reference fuel oil price. Name of bunkering location indicates the bunkering location of the reference fuel oil price. Type of oil indicates the type of fuel oil for which the reference fuel oil price is provided. Type of oil signifies a type of fuel oil, and in the present embodiment, types of fuel oil with different grades (quality) are classified separately. For example, type of oil "HFO/500 cSt" exemplified in FIG. 4 indicates heavy fuel oil with a kinematic viscosity of 500 cSt.

Reference fuel oil price data providing server device 12 extracts reference fuel oil price data for a date specified by reference fuel oil price database in accordance with request data sent from fuel oil information providing server device 11, and sends the data to fuel oil information providing server device 11. When reference fuel oil price data acquisition unit 111 receives reference fuel oil price data sent from reference fuel oil price data providing server device 12, reference fuel oil price data acquisition unit 111 delivers the reference fuel oil price data to a fuel oil price data generation unit 113 described below.

Returning to FIG. 3, the following is a continuation of the explanation of the functional configuration of fuel oil information providing server device 11. Fuel oil information providing server device 11 is provided with a correction conditions data acquisition unit 112 that acquires correction conditions data indicating conditions (correction conditions) for correcting reference fuel oil prices indicated by reference fuel oil price data acquired by reference fuel oil price data acquisition unit 111 from reference fuel oil price data providing server device 12. Correction conditions data is pre-stored in memory 102 of computer 10 that constitutes fuel oil information providing server device 11, and correction conditions data acquisition unit 112 acquires the correction conditions data by reading the data from memory 102. Correction conditions data acquisition unit 112 may acquire correction conditions data stored in an external storage device via an input/output interface 104 or communication interface 103 in place of reading the correction conditions data from memory 102.

Correction conditions data is stored and managed in a correction conditions database. FIG. 5 is a drawing exemplifying the data configuration of a correction conditions database. Each of the items of correction data stored in the correction conditions database indicates a correction condition corresponding to a combination of name of bunkering location, supplier and type of oil. The following is an explanation of items of correction data. Name of bunkering location indicates the bunkering location of a fuel oil price a correction condition relates to. Supplier indicates the name of a fuel oil supplier. Type of oil indicates the type of fuel oil. Correction conditions are conditions pertaining to a discount or the like, which is determined based on a sales agreement and the like of fuel oil that is agreed upon between a shipping business operator that operates a shipping business (a business operator that uses fuel oil information providing system 1) and fuel oil suppliers at each of the bunkering locations. For example, the correction condition "reference price Rotterdam HFO/500 cSt-USD5" exemplified in line one of FIG. 5 indicates that, when purchasing fuel oil with type of oil HFO/500 cSt from company A in Rotterdam, the price (per metric ton) is 5 USD less than the reference fuel oil price.

Correction conditions data acquisition unit 112 reads the correction data stored in a correction conditions database and delivers the correction data to fuel oil price data generation unit 113 in accordance with a request from fuel oil price data generation unit 113.

Returning once again to FIG. 3, explanation of the functional configuration of fuel oil information providing server device 11 is continued. Fuel oil information providing server device 11 is provided with a fuel oil price data generation unit 113 that generates fuel oil price data indicating a fuel oil price in which the reference fuel oil price has been corrected in accordance with correction conditions. When fuel oil price data generation unit 113 receives reference fuel oil price data of a date specified by reference fuel oil price data acquisition unit 111, fuel oil price data generation unit 113 requests correction conditions data from correction conditions data acquisition unit 112, and receives correction conditions data pertaining to a plurality of bunkering locations as a response from correction conditions data acquisition unit 112. Fuel oil price data generation unit 113 generates, for each of the bunkering locations, fuel oil price data indicating fuel oil price in which a reference fuel oil price indicated by reference fuel oil price data received from reference fuel oil price data acquisition unit 111 has been corrected in accordance with correction conditions indicated by correction conditions data received from correction conditions data acquisition unit 112. Fuel oil price data generation unit 113 associates the generated fuel oil price data with date data that indicates the date the fuel oil price indicated by the fuel oil price data was obtained, and delivers the data to a fuel oil price data storage unit 114, which is explained as follows.

Fuel oil information providing server device 11 is provided with a fuel oil price data storage unit 114 that stores fuel oil price data generated by fuel oil price data generation unit 113. When fuel oil price data storage unit 114 receives newly generated fuel oil price data from fuel oil price data generation unit 113 along with date data, fuel oil price data storage unit 114 stores the data in a fuel oil price database. FIG. 6 is a drawing exemplifying the data configuration of a fuel oil price database. A fuel oil price database is provided with the data field "fuel oil price" in place of the field "reference fuel oil price" provided by a reference fuel oil price database (FIG. 4). The data field "fuel oil price" stores data indicating fuel oil prices obtained by correcting reference fuel oil prices in accordance with correction conditions. A fuel oil price database is also provided with the data field "supplier". The data field "supplier" stores names of fuel oil suppliers that sell fuel oil at corrected fuel oil prices.

Returning once again to FIG. 3, explanation of the functional configuration of fuel oil information providing server device 11 is continued. Fuel oil information providing server device 11 is also provided with a display instruction data request acquisition unit 115 that acquires request data that requests display instruction data, which is sent from terminal device 13 or terminal device 14 in accordance with a user's input operation. Request data that requests display instruction data includes a voyage ID, which identifies a sailing route specified by a user. Display instruction data request acquisition unit 115 is provided with a sailing route identification data acquisition unit 1151 that acquires the name of a sailing route corresponding to a voyage ID included in acquired request data, and a ship identification data acquisition means 1152 that acquires the name of a ship corresponding to the voyage ID as ship identification data.

For sailing route identification data acquisition unit 1151 and ship identification data acquisition unit 1152 to acquire the name of a sailing route and the name of a ship, memory 102 of computer 10 that constitutes fuel oil information providing server device 11 stores voyage management data indicated in FIG. 7. Voyage management data is data indicating voyage ID, ship name, which identifies a ship that performs a voyage that is identified by the voyage ID, and name of sailing route, which identifies a sailing route corresponding to a voyage that is identified by the voyage ID.

Sailing route identification data (name of sailing route) acquired by sailing route identification data acquisition unit 1151 specifically identifies sailing route data indicating a sailing route. Sailing route data is stored in memory 102 of computer 10 that constitutes fuel oil information providing server device 11, and is read by a display instruction data generation unit 122, described below. Display instruction data generation unit 122 may acquire sailing route data stored in an external storage device via input/output interface 104 or communication interface 103, for example, in place of reading sailing route data from memory 102.

FIG. 8 is a drawing exemplifying the configuration of sailing route data. Sailing route data is prepared in accordance with each sailing route identified by a sailing route name, and indicates a sailing route by showing port names that identify ports on a sailing route from a departure port to a destination port in order of calling. Sailing route data includes data pertaining to bunkering locations that are not ports of call per se but are near the sailing route and at which ship 9 is able to call for bunkering during voyage, in addition to the original ports of call (including departure point and destination point). The following is an explanation of the items of sailing route data. Order of calling indicates the order of calling during voyage (assuming a ship calls at bunkering locations that are not ports of call per se). Port name indicates the name of a port of call (and bunkering locations at which calling is possible). Type indicates the type of bunkering port. Ports of which the type is "-" are ports at which bunkering is not possible. Type of oil indicates the type of oil that can be bunkered at that port.

Returning once again to FIG. 3, explanation of the functional configuration of fuel oil information providing server device 11 is continued. Fuel oil information providing server device 11 is provided with a fuel oil price data acquisition unit 116 that acquires fuel oil price data stored in fuel oil price data storage unit 114 by reading the data. Fuel oil price data acquisition unit 116 extracts, from a fuel oil price database (FIG. 6) stored in fuel oil price data storage unit 114, fuel oil price data indicating fuel oil price within a past predetermined time period at a bunkering location specified by display instruction data generation unit 122 described below, and delivers the fuel oil price data to display instruction data generation unit 122.

Fuel oil information providing server device 11 is also provided with a bunkering plan data acquisition unit 117 that acquires bunkering plan data indicating a standard bunkering plan of a specified voyage by indicating determination rules of a standard bunkering amount at a standard bunkering location when ship 9 traverses a sailing route indicated by sailing route data. Bunkering plan data is stored in memory 102 of computer 10 that constitutes fuel oil information providing server device 11 in advance, and bunkering plan data acquisition unit 117 acquires bunkering plan data by reading the data from memory 102. Bunkering plan data acquisition unit 117 may acquire bunkering plan data stored in an external storage device via input/output interface 104 or communication interface 103, for example, in place of reading bunkering plan data from memory 102.

Bunkering plan data is stored and managed in a bunkering plan database. FIG. 9 is a drawing exemplifying the data configuration of a bunkering plan database. A bunkering plan database is prepared for each of a combination of ship name and sailing route name, and stores bunkering plan data indicating determination rules for standard bunkering locations and bunkering amounts at the bunkering locations when a ship specified by a ship name traverses a sailing route specified by a sailing route name. The following is an explanation of items of data stored in a bunkering plan database. Name of bunkering location indicates a bunkering location in a standard bunkering plan. Type of oil indicates a type of fuel oil that should be used for bunkering at a bunkering location. Bunkering amount determination rules indicate rules (points of attention) for determining a bunkering amount at a bunkering location.

For example, the bunkering plan database exemplified in FIG. 9 indicates, as a whole, a standard bunkering plan when ship 9 identified by ship name "BBB Maru" traverses a sailing route identified by sailing route name "AAA". The data in the first line exemplified in FIG. 9 indicates that, it should be determined that, when following a standard bunkering plan, fuel oil HFO/500 cSt should be bunkered at Rotterdam, where a bunkering amount of 2000 MT should be ensured as a remaining amount for safe arrival in Singapore (return path).

Bunkering plan data acquisition unit 117 reads bunkering plan data from a bunkering plan database corresponding to a combination of ship name and sailing route name instructed by display instruction data generation unit 122, and delivers the data to display instruction data generation unit 122.

Returning once again to FIG. 3, explanation of the functional configuration of fuel oil information providing server device 11 is continued. Fuel oil information providing server device 11 is provided with a remaining oil amount data acquisition unit 118 that acquires remaining oil amount data indicating the current remaining oil amount in a fuel tank (in each fuel tank, when there is a plurality of fuel tanks) provided on a ship, and a current position data acquisition unit 119 that acquires current position data indicating the current position of a ship. Remaining oil amount data acquisition unit 118 communicates with terminal device 14 using communication interface 103 of computer 10 that constitutes fuel oil information providing server device 11, sends request data of remaining oil amount data to terminal device 14, and acquires the remaining oil amount data sent as a response to the request data by receiving the data. Similarly, current position data acquisition unit 119 communicates with terminal device 14 using communication interface 103 of computer 10 that constitutes fuel oil information providing server device 11, sends request data of current position data to terminal device 14, and acquires the current position data send as a response to the request data by receiving the data.

For example, the fuel tank(s) on ship 9 is provided with a remaining oil amount measuring device that measures the remaining oil amount, and terminal device 14 receives signals indicating the remaining oil amount continuously output by the remaining oil amount measuring device. When terminal device 14 receives request data from fuel oil information providing server device 11, terminal device 14 generates remaining oil amount data indicating the remaining oil amount indicated by a signal that was received most recently from the remaining oil amount measuring device, and sends the data to fuel oil information providing server device 11. A GPS (Global Positioning System) is connected to terminal device 14, and terminal device 14 receives signals indicating position (coordinates) continuously output by the GPS. When terminal device 14 receives request data from fuel oil information providing server device 11, terminal device 14 generates current position data indicating the position indicated by the signal received most recently from the GPS, and sends the data to fuel oil information providing server device 11. A ship name (ship identification data) that identifies ship 9 accompanies the remaining oil amount data and the current position data, and display instruction data generation unit 122 generates display instruction data described below using remaining oil amount data and current position data corresponding to a ship name acquired by ship identification data acquisition unit 1152.

Fuel oil information providing server device 11 is also provided with a rule data acquisition unit 120 that acquires rule data indicating each type of rule that should be taken into consideration when a user formulates a bunkering plan. Rule data is pre-stored in memory 102 of computer 10 that constitutes fuel oil information providing server device 11, and rule data acquisition unit 120 acquires rule data from reading the data from memory 102. Rule data acquisition unit 120 may acquire rule data stored in an external storage device via input/output interface 104 or communication interface 103, for example, in place of reading rule data from memory 102.

FIG. 10 is a drawing exemplifying the data configuration of rule data. Rule data includes per-sailing route formulation rule data (FIG. 10(a)) indicating rules for formulating a bunkering plan pertaining to each of a plurality of sailing routes, per-ship formulation rule data (FIG. 10(b)) indicating rules for formulating a bunkering plan pertaining to each of a plurality of ships, per-port formulation rule data (FIG. 10(c)) indicating rules for formulating a bunkering plan pertaining to each of a plurality of ports, and price determination rule data (FIG. 10(d)) indicating determination rules (settlement terms, price determination date, terms of contract, minimum bunkering amount, specification of type of fuel oil and the like per supplier) for determining an actual fuel price at each of a plurality of bunkering locations.

Rule data acquisition unit 120 is provided with: a per-sailing route formulation rule data acquisition means 1201 that acquires per-sailing route formulation rule data corresponding to a sailing route specified by a user (a sailing route identified by a sailing route name acquired by sailing route identification data acquisition unit 1151) from among items of sailing route identification data (FIG. 10(a)) pertaining to a plurality of sailing routes; a per-ship formulation rule data acquisition unit 1202 that acquires per-ship formulation rule data corresponding to a ship specified by a user (ship identified by a ship name acquired by ship identification data acquisition unit 1152) from among items of per-ship formulation rule data pertaining to a plurality of ships; a per-port formulation rule data acquisition unit 1203 that acquires per-port formulation rule data corresponding to bunkering locations on a sailing route specified by a user (and bunkering locations at which calling is possible from the sailing route) from among items of per-port formulation rule data (FIG. 10(c)) pertaining to a plurality of ports; and a price determination rule data acquisition unit 1204 that acquires price determination rule data corresponding to bunkering locations on a sailing route specified by a user (and bunkering locations at which calling is possible from the sailing route) from among items of price determination rule data (FIG. 10(d)) pertaining to a plurality of bunkering locations.

Fuel oil information providing server device 11 is also provided with a display instruction data output unit 121 that outputs display instruction data to a display device (or a system provided with a display device) in accordance with request data acquired by display instruction data request acquisition unit 115. Display instruction data output unit 121 acquires display instruction data generated by display instruction data generation unit 122 in accordance with request data, and outputs the display instruction data by sending the display instruction data to terminal device 13 or terminal device 14, which is the source of request, using communication interface 103 of computer 10 that constitutes fuel oil information providing server device 11.

Display instruction data generation unit 122 generates display instruction data corresponding to a sailing route and ship name delivered from sailing route identification data acquisition unit 1151 and ship identification data acquisition unit 1152 of display instruction data request acquisition unit 115.

Figure 11:
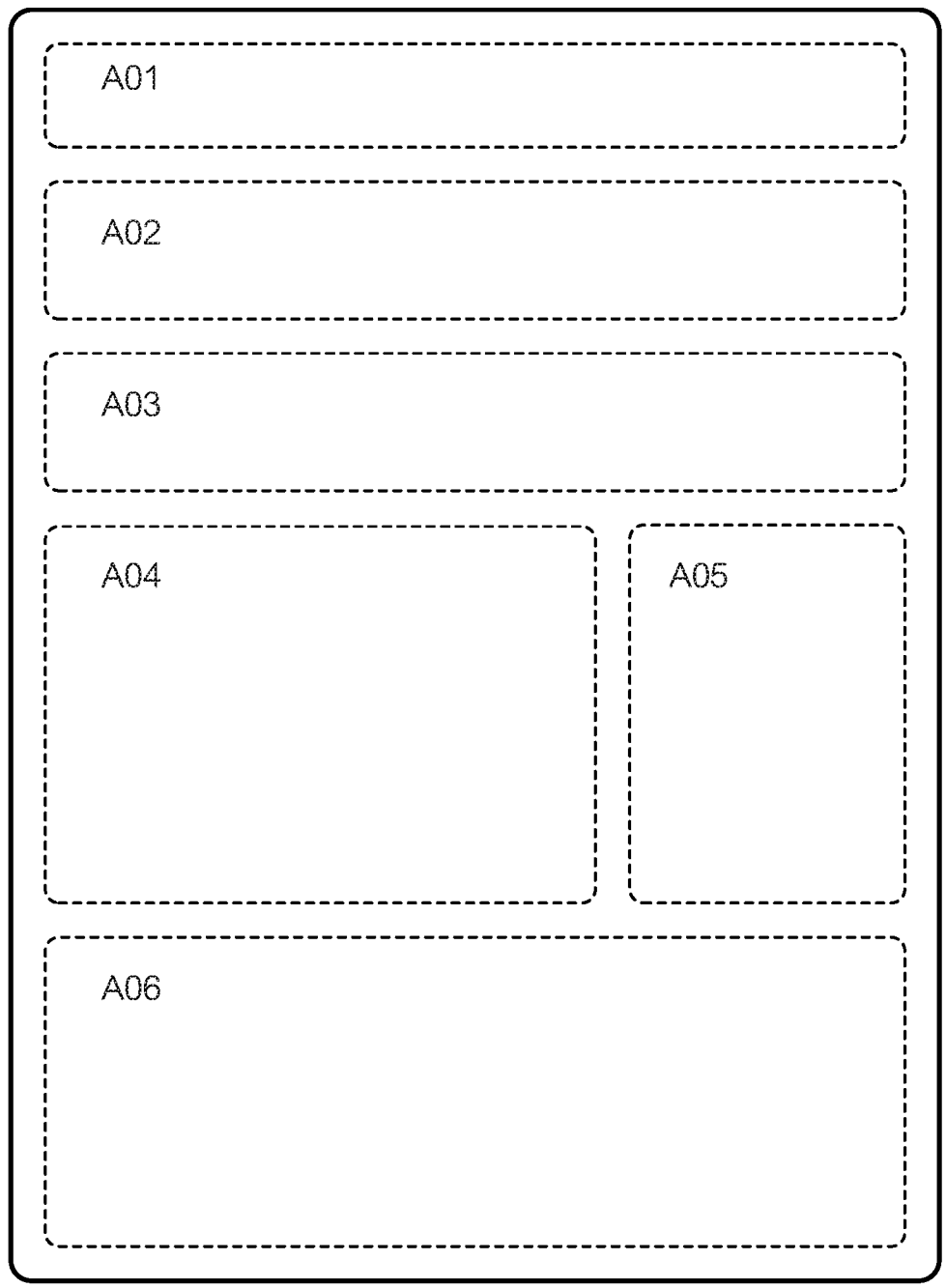
FIG. 11 is a drawing illustrating the screen layout displayed on a terminal device as in one embodiment of the present invention.

FIG. 11 is a drawing exemplifying the layout of a fuel oil information providing screen displayed on a display (display device) of terminal device 13 or terminal device 14 in accordance with display instruction data generated by display instruction data generation unit 122, and FIGS. 12-18 are drawings exemplifying information displayed in each region (A01-A06) of a fuel oil information supplying screen illustrated in FIG. 11.

As exemplified in FIG. 12, region A01 displays voyage ID, and ship name and sailing route name corresponding to the voyage ID. If a user selects by clicking or the like an arrow displayed to the right of each field such as voyage ID displayed in region A01, the fuel oil information supplying screen displays options such as voyage ID that can be input to each field in list form. A user is able to specify a voyage for which information is displayed on the fuel oil information supplying screen by selecting an option from the list. A user is also able to specify a voyage to be displayed on the fuel oil information supplying screen by directly inputting voyage ID or the like in each of the fields displayed in region A01.

As exemplified in FIG. 13, region A02 displays rules for a bunkering plan formulation indicated by per-route formulation rule data (FIG. 10(a)) and per-ship formulation rule data (FIG. 10(b)).

As exemplified in FIG. 14, region A03 displays a standard bunkering plan indicated by bunkering plan data (FIG. 9).

Figure 15:
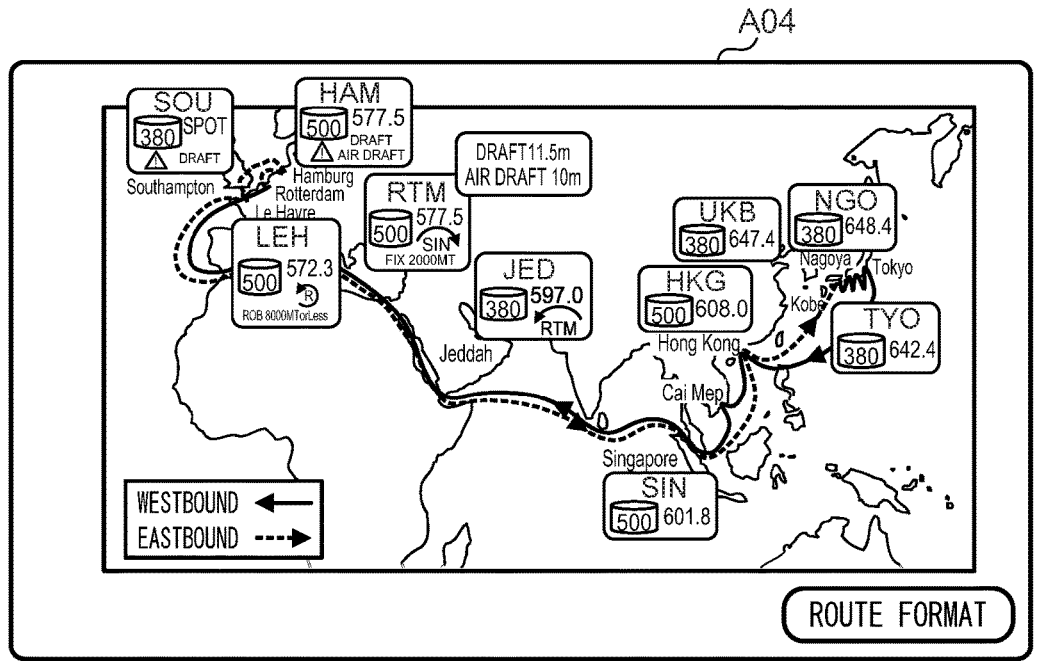
FIG. 15 is a drawing illustrating an example of information displayed on a screen of a terminal device as in one embodiment of the present invention.
Figure 16:
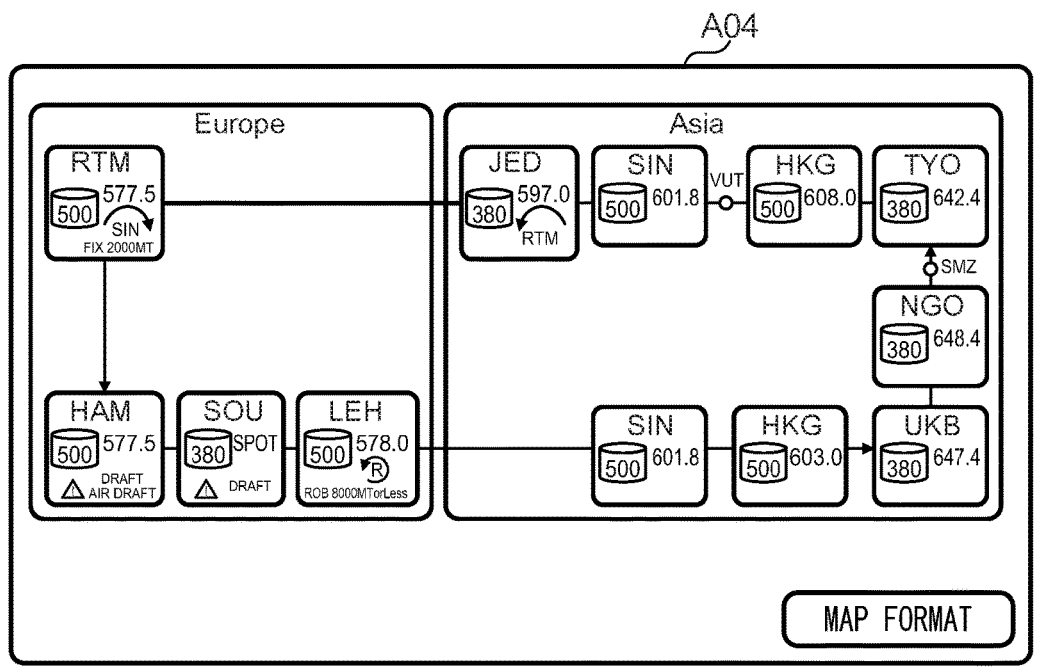
FIG. 16 is a drawing illustrating an example of information displayed on a screen of a terminal device as in one embodiment of the present invention.

As exemplified in FIG. 15, region A04 displays sailing routes and fuel oil prices on a map. The lines accompanying the arrows displayed on the map exemplified in FIG. 15 indicate sailing routes. A plurality of windows are arranged on the map, and each of these windows displays an abbreviation of the name of a bunkering location ("RTM" signifying Rotterdam, or the like), and the type of oil and price of fuel oil that should be used for bunkering at that bunkering location (for example, the lowest price if bunkering of the same type of oil from a plurality of suppliers is possible).

Some of the plurality of windows arranged on the map exemplified in FIG. 15 display symbols or letters corresponding to the details of the bunkering plan in addition to an abbreviation of a name of a bunkering location, fuel oil price and type of oil. A user is able to ascertain instinctively a bunkering plan by referring to these symbols and letters.

Some of the windows display a warning symbol. If a user performs a prescribed operation such as a mouseover on a window that displays a warning symbol, rules for bunkering plan formulation indicated by per-port formulation rule data (FIG. 10(c)) are displayed.

The map in region A04 displays bunkering locations that are not ports of call per se at which a ship can call from the sailing route (for example, bunkering location "SOU" (Southampton) exemplified in FIG. 15) in addition to the bunkering locations on the sailing route.

A user is able to switch the display format of the information in region A04 from the format exemplified in FIG. 15 (map format) to route format. For example, if a user selects by clicking or the like a "route format" button displayed to the bottom right of the map in a state whereby region A04 is displaying the map exemplified in FIG. 15 (map format), region A04 displays information in the format exemplified in FIG. 16. In route format, information such as fuel oil price pertaining to bunkering locations on a sailing route and bunkering locations at which calling is possible from the sailing route are displayed in a row in an order according to the sailing route. Display in route format shows less information than display in map format, but provides an advantage that a user is able easily to ascertain the calling order at bunkering locations and the like. A user can view information in map format in region A04 by selecting by clicking or the like a "map format" button on the route format display.

As exemplified in FIG. 17, region A05 displays determination rules for fuel oil prices indicated by price determination rule data (FIG. 10(d)). A user can view determination rules for fuel oil prices at a desired port in region A05 by specifying a port in region A04.

As exemplified in FIG. 18, region A06 displays changes in fuel oil prices in past predetermined time periods for each of the bunkering locations on a sailing route as a graph (right) or a table (bottom).

Figure 19:
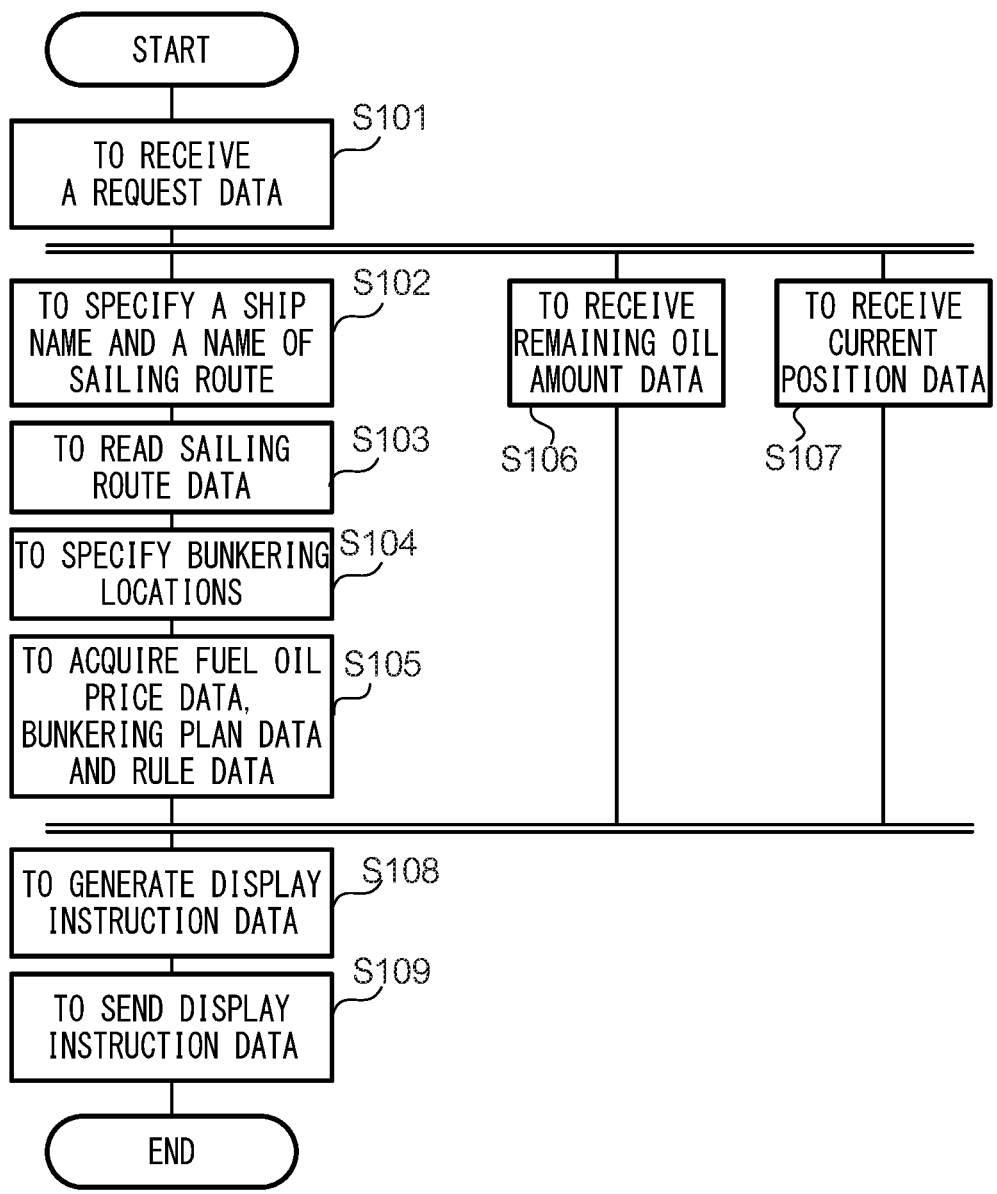
FIG. 19 is a flow chart showing a process performed by a fuel oil information providing server device as in one embodiment of the present invention.

Next, the following is an explanation of a process that is performed when fuel oil information providing server device 11 generates display instruction data that instructs display of a fuel oil information supplying screen mainly as exemplified in FIGS. 11-18 by display instruction data generation unit 122. FIG. 19 is a flow chart showing a process performed by fuel oil information providing server device 11 according to generation of display instruction data.

Generation of display instruction data begins when a voyage ID that identifies a voyage for which information is to be obtained by terminal device 13 or terminal device 14 is input to terminal device 13 or terminal device 14. The fuel oil information supplying screen displayed on the display of terminal device 13 or terminal device 14 also serves as an input screen to which a user of terminal device 13 or terminal device 14 inputs voyage ID.

That is, the "voyage ID" text box in region A01 receives data input by a user, and if a user inputs a voyage ID in the "voyage ID" text box, terminal device 13 or terminal device 14 generates request data including the voyage ID input by the user and sends the request data to fuel oil information providing server device 11. Display instruction data request acquisition unit 115 of fuel oil information providing server device 11 receives the request data sent from terminal device 13 or terminal device 14 (step S101).

Sailing route identification data acquisition unit 1151 and ship identification data acquisition unit 1152 of display instruction data request acquisition unit 115 specify a ship name and sailing route name corresponding to the voyage ID included in the request data received in step S101 in accordance with the voyage management data (FIG. 7) (step S102) and deliver the ship name and sailing route name to display instruction data generation unit 122.

Display instruction data generation unit 122 reads sailing route data corresponding to the sailing route name delivered in step S102 (FIG. 8) from memory 102 (step S103), and specifies bunkering locations on the sailing route indicated by the read sailing route data and bunkering locations at which calling is possible from the sailing route (step S104).

Next, display instruction data generation unit 122 delivers the port names (names of bunkering locations) of the bunkering locations specified in step S104 to fuel oil price data acquisition unit 116. Fuel oil price data acquisition unit 116 extracts fuel oil price data within a past predetermined time period corresponding to the delivered bunkering location names from a fuel oil price database stored in fuel oil price data storage unit 114 (FIG. 6).

Display instruction data generation unit 122 delivers the ship name and sailing route name specified in step S102 to bunkering plan data acquisition unit 117. Bunkering plan data acquisition unit 117 acquires bunkering plan data from a bunkering plan database corresponding to the delivered ship name and sailing route name (FIG. 9). Further, display instruction data generation unit 122 delivers the sailing route name and ship name specified in step S102 and the bunkering location names specified in step S104 to rule data acquisition unit 120. Rule data acquisition unit 120 extracts, from rule data stored in memory 102 (FIG. 10), per-route formulation rule data corresponding to the delivered sailing route name (FIG. 10(a)), per-ship formulation rule data corresponding to the delivered ship name (FIG. 10(b)), per-port formulation rule data corresponding to the delivered bunkering location names (port names) (FIG. 10(c)), and price determination rule data (FIG. 10(d)). Fuel oil price data acquisition unit 116, bunkering plan data acquisition unit 117 and rule data acquisition unit 120 deliver acquired data to display instruction data generation unit 122 (step S105).

Side by side with the processes in steps S102-S105, display instruction data generation unit 122 instructs acquisition of remaining oil amount data to remaining oil amount data acquisition unit 118. Remaining oil amount data acquisition unit 118 sends request data for remaining oil amount data to terminal device 14 in accordance with the instructions from display instruction data generation unit 122, and receives remaining oil amount data sent from terminal device 14 as a response to the request data (step S106). Remaining oil amount data acquisition unit 118 delivers the received remaining oil amount data to display instruction data generation unit 122.

Further, side by side with the processes in steps S102-S106, display instruction data generation unit 122 instructs acquisition of current position data to current position data acquisition unit 119. Current position data acquisition unit 119 sends request data for current position data to terminal device 14 in accordance with the instructions from display instruction data generation unit 122, and receives current position data sent from terminal device 14 as a response to the request data (step S107). Current position data acquisition unit 119 delivers the received current position data to display instruction data generation unit 122.

Next, display instruction data generation unit 122 generates display instruction data using the data acquired by the above-described process (step S108).

Display instruction data generation unit 122 delivers the display instruction data generated in step S108 to display instruction data output unit 121, and display instruction data output unit 121 sends the display instruction data received from display instruction data generation unit 122 to terminal device 13 or terminal device 14, which is the source of request (step S109).

This completes the process performed by fuel oil information providing server device 11 in accordance with generation of display instruction data. Terminal device 13 or terminal device 14 displays a fuel oil information supplying screen such as those exemplified in FIGS. 1-18 on a display in accordance with display instruction data sent from fuel oil information providing server device 11 according to transmission of request data.

According to fuel oil information providing system 1 provided with the configuration described above, a user such as a ship operation manager, ship navigator or the like of a ship is able to view in list form a variety of information that serves as determination information when formulating a bunkering plan of a voyage identified by a voyage ID on the display of terminal device 13 or terminal device 14 by inputting the voyage ID to terminal device 13 or terminal device 14.

When displaying the above-described information, the display does not display information that is not relevant to formulation of a bunkering plan made by a user, such as fuel oil prices at bunkering locations at which ship 9 is not able to call during its voyage. Accordingly, a user is not required to search for information on bunkering locations necessary for formulating a bunkering plan from information on a large number of bunkering locations. Since the fuel oil prices displayed on the display are the fuel oil prices that reflect conditions such as a sales agreement made between an operator that uses fuel oil information providing system 1 and fuel oil suppliers or the like, a user is not required to perform the task of applying the conditions to a reference fuel oil price.

As a result, according to fuel oil information providing system 1, a user is able to formulate a bunkering plan easily and appropriately.

Modified Example

Various modifications may be made to the embodiment described above within the scope of the technical idea of the present invention. Examples of such modifications are as follows.

(1) In the embodiment described above, information related to weather and/or marine conditions encountered by a ship during voyage is not displayed on the fuel oil information supplying screen, but a configuration in which the fuel oil information supplying screen displays information related to weather and/or marine conditions may be adopted.

Figures 20, 21:
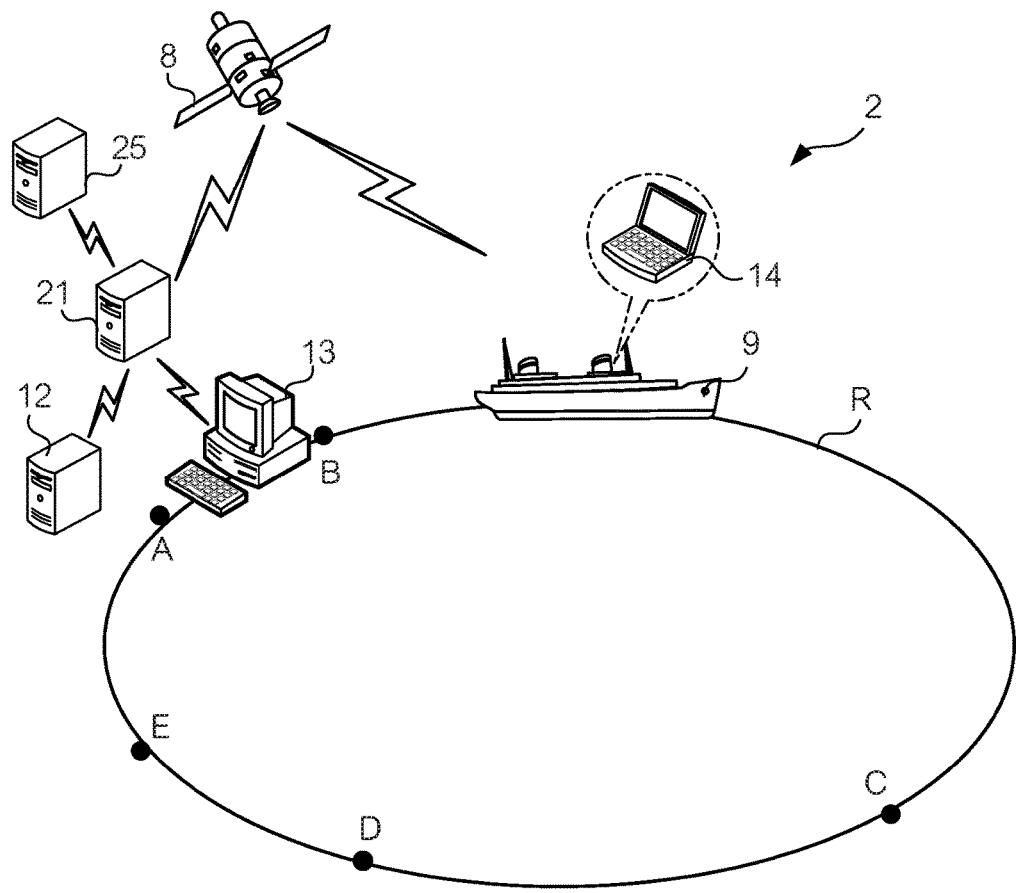
FIG. 20 is a drawing illustrating the overall configuration of a fuel oil information providing system as in a modified example of the present invention.
FIG. 21 is a drawing illustrating the configuration of data used by a fuel oil information providing server device as in a modified example of the present invention.

FIG. 20 is a drawing schematically illustrating the overall configuration of a fuel oil information providing system 2 as in the present modified example. In addition to the configuration provided in fuel oil information providing system 1, fuel oil information providing system 2 is provided with a weather and marine information providing server device 25 that provides weather and marine data indicating information related to weather and/or marine conditions. Fuel oil information providing system 2 is provided with a fuel oil information providing server device 21 in place of fuel oil information providing server device 11 provided in fuel oil information providing system 1.

In the following explanation, descriptions of configurations or operations that are common to fuel oil information providing system 2 and fuel oil information providing system 1 are omitted, and the differences between fuel oil information providing system 2 and fuel oil information providing system 1 are mainly explained. For components provided in both fuel oil information providing system 2 and fuel oil information providing system 1, the reference numerals used in fuel oil information providing system 1 are used.

The hardware configuration of weather and marine information providing server device 25 is computer 10 provided with a general configuration illustrated in FIG. 2. Since the functional configuration of weather and marine information providing server device 25 is similar to the functional configuration of a general server device that sends data stored in advance to a device that is the source of request in accordance with requests from other devices, explanation thereof is omitted.

FIG. 21 is a drawing illustrating the configuration of weather and marine data provided by weather and marine information providing server device 25. Weather and marine data indicates information related to weather and marine conditions at a specific time range in a specific sea area. The weather and marine data exemplified in FIG. 21 indicates wind speed, wind direction, wave height, wave direction, tide speed and tide direction as numerical values or the like, as information related to weather and marine conditions. The categories of information indicated by weather and marine data are not limited thereto, and other categories such as wave period, for example, may be used.

Figure 22:
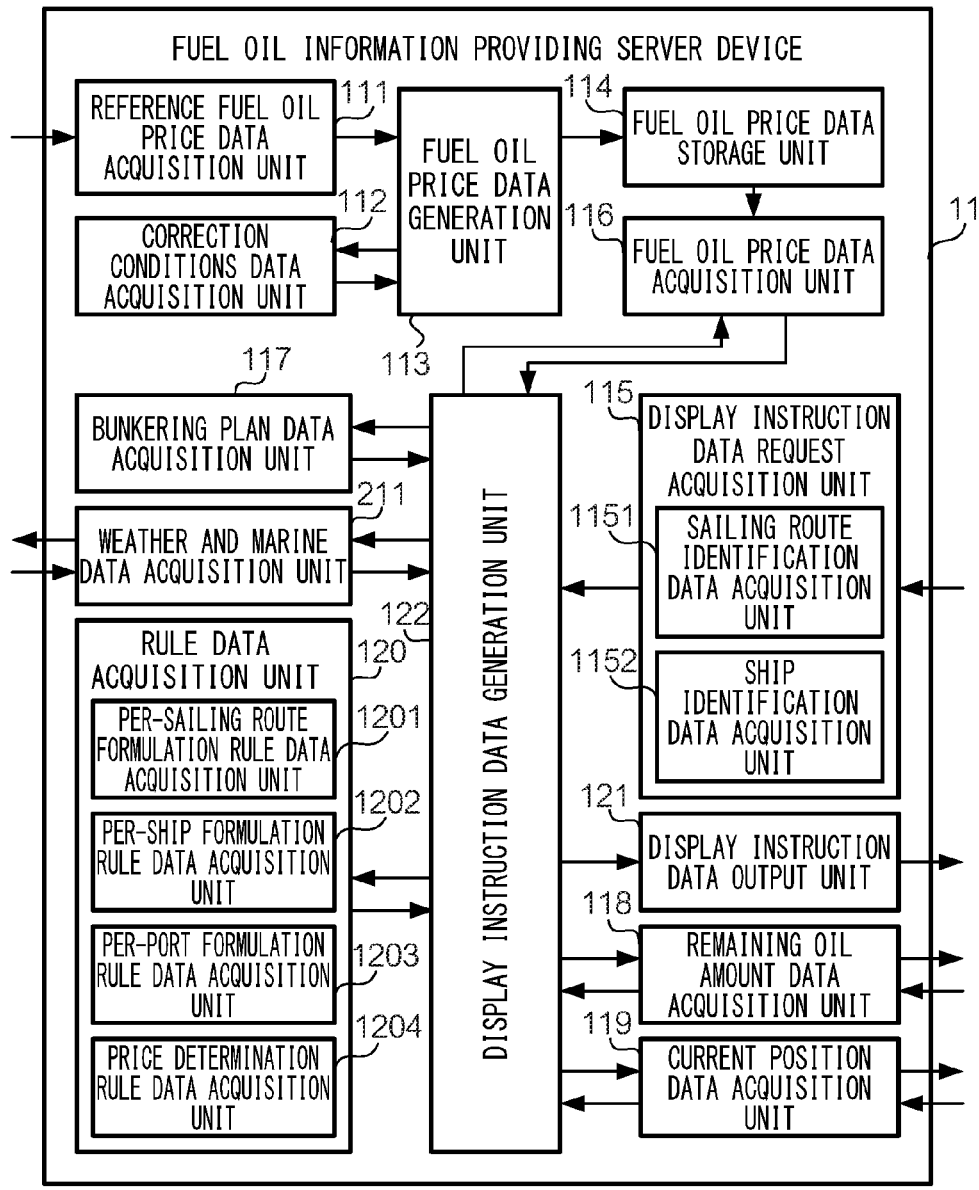
FIG. 22 is a drawing illustrating the functional configuration of a fuel oil information providing server device as in a modified example of the present invention.

FIG. 22 is a drawing illustrating the functional configuration of fuel oil information providing server device 21. In addition to the functional components provided in fuel oil information providing server device 1, fuel oil information providing server device 21 is provided with a weather and marine data acquisition unit 211. Weather and marine data acquisition unit 211 sends request data for weather and marine data to weather and marine information providing server device 25 using communication interface 103 of computer 10 that constitutes fuel oil information providing server device 21 in accordance with a request from display instruction data generation unit 122, and acquires weather and marine data by receiving weather and marine data sent from weather and marine information providing server device 25 as a response to the request data. Weather and marine data acquisition unit 211 delivers weather and marine data received from weather and marine information providing server device 25 to display instruction data generation unit 122.

FIG. 23 is a drawing illustrating the configuration of sailing route data used by fuel oil information providing server device 21. Sailing route data used by fuel oil information providing server device 21 differs from sailing route data used by fuel oil information providing server device 11 (FIG. 8) and is prepared for each combination of ship name and sailing route name, and indicates, in addition to the names of the ports on the sailing route, the time at which a ship arrives at those ports (time of arrival at port) and the time at which a ship departs from those ports (time of departure from port). That is, sailing route data used by fuel oil information providing server device 21 indicates voyage schedule in addition to sailing route.

Figure 24:
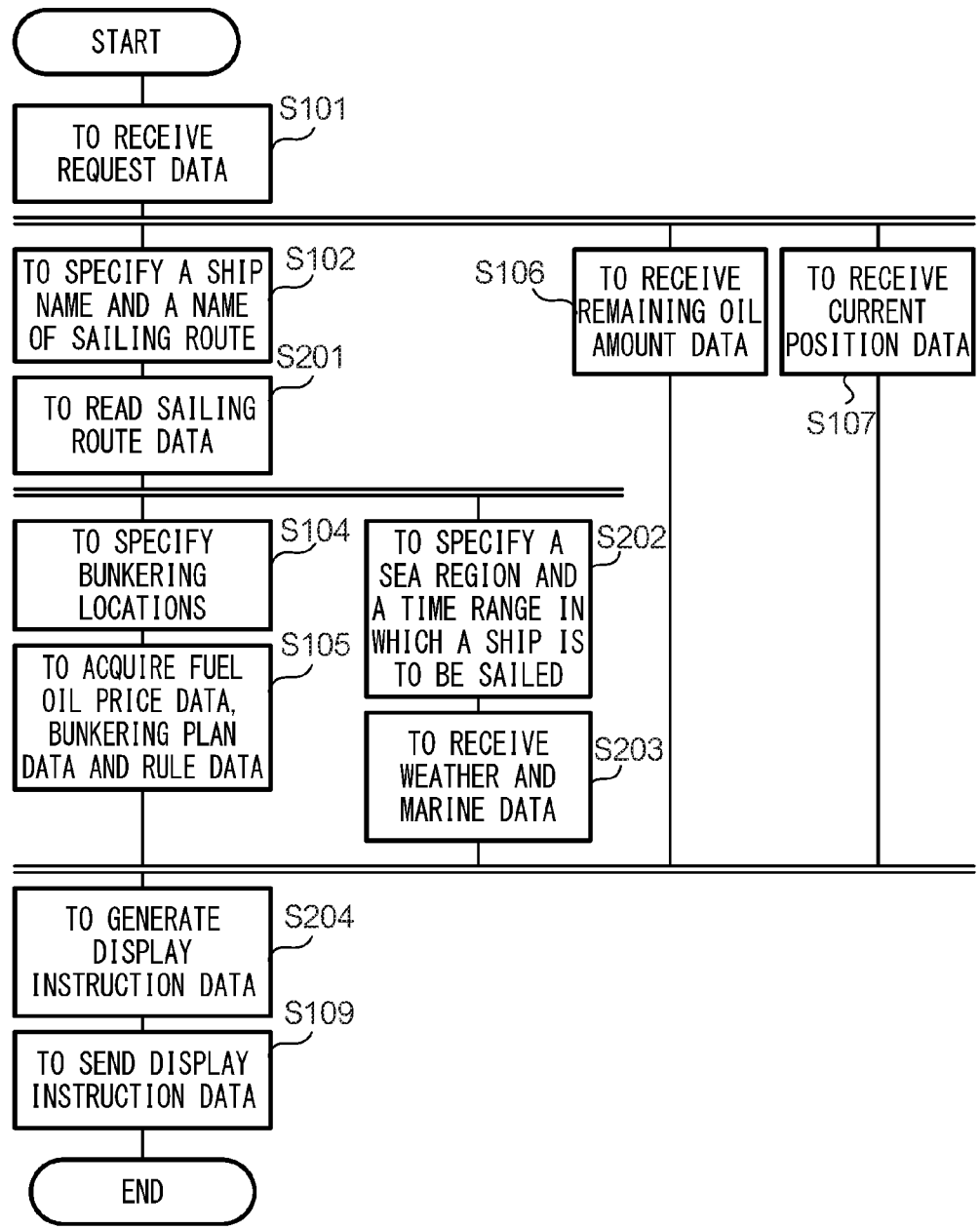
FIG. 24 is a flow chart showing a process performed by a fuel oil information providing server device as in a modified example of the present invention.

FIG. 24 is a flow chart showing processes performed by fuel oil information providing server device 21 according to generation of display instruction data. Fuel oil information providing server device 21 receives weather and marine data in addition to the processes performed by fuel oil information providing server device 11 during generation of display instruction data.

More specifically, display instruction data generation unit 122 of fuel oil information providing server device 21 reads sailing route data corresponding to a combination of ship name and sailing route name delivered from display instruction data request acquisition unit 115 in step S102 (FIG. 23) from memory 102 (step S201).

Next, display instruction data generation unit 122 specifies the sea region and time range in which a ship is to be operated on the basis of sailing route and voyage schedule indicated by sailing route data read in step S201 (step S202).

Next, display instruction data generation unit 122 generates request data including data indicating the combination of sea area and time range specified in step S202, and delivers the request data to weather and marine data acquisition unit 211. Weather and marine data acquisition unit 211 sends the request data received from display instruction data generation unit 122 to weather and marine information providing server device 25. Weather and marine information providing server device 25 sends weather and marine data corresponding to the combination of sea area and time range indicated by the data included in the request data sent from fuel oil information providing server device 21 (FIG. 21) to fuel oil information providing server device 21. Weather and marine data acquisition unit 211 receives weather and marine data sent from weather and marine information providing server device 25 as a response to the request data (step S203), and delivers the weather and marine data to display instruction data generation unit 122.

Display instruction data generation unit 122 generates display instruction data that instructs display of information related to weather and marine conditions indicated by the weather and marine data received from weather and marine information providing server device 25 in step S203 (step S204).

Figures 25, 26:
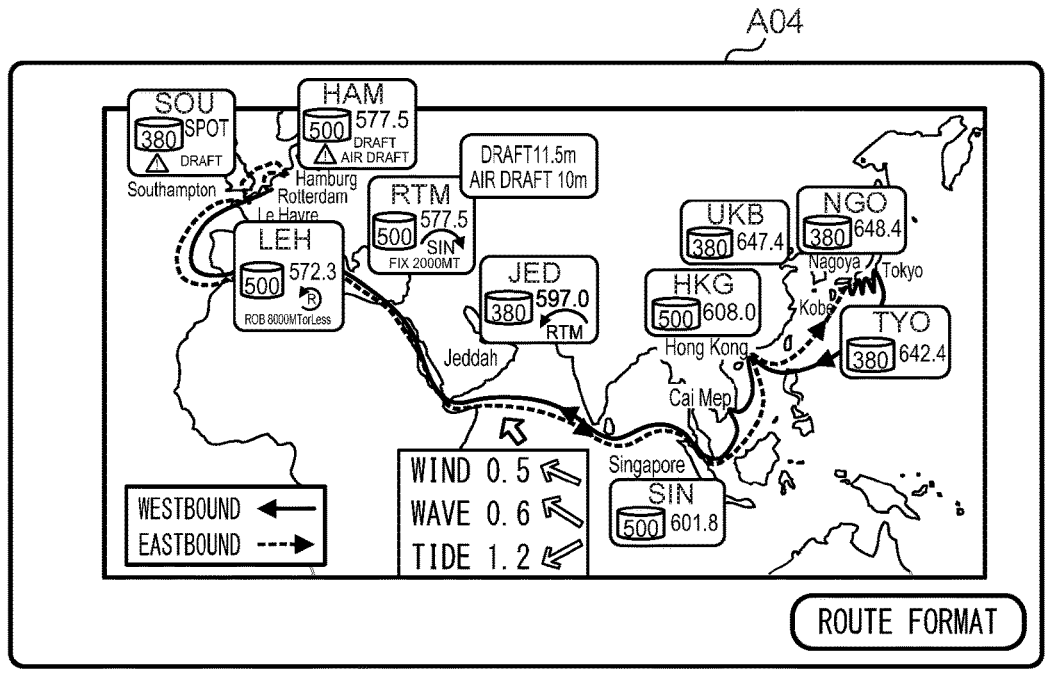
FIG. 25 is a drawing illustrating an example of information displayed on the screen of a terminal device as in a modified example of the present invention.
FIG. 26 is a drawing illustrating the configuration of data used by a fuel oil information providing server device as in a modified example of the present invention.

FIG. 25 is a drawing exemplifying information (map format) displayed in region A04 (FIG. 11) on the fuel oil information supplying screen on the display of terminal device 13 or terminal device 14 in accordance with display instruction data generated by fuel oil information providing server device 21. If, for example, a user performs a prescribed operation such as a mouseover on a line that indicates a sailing route displayed on the map in region A04, the fuel oil information supplying screen according to the present modified example displays information related to weather and marine conditions encountered by a ship on a sailing route specified by the operation. The display mode of information related to weather and marine conditions is not limited thereto, and a different display mode displaying, for example, information related to weather and marine conditions across an entire sailing route as a list in table format may be adopted.

As described above, according to fuel oil information providing system 2 according to the present modified example, since information related to weather and marine conditions corresponding to individual voyage schedules is displayed, a user is able to formulate a more suitable bunkering plan while taking into consideration weather and marine conditions.

(2) In the embodiment described above, reference fuel oil price data acquisition unit 111 of fuel oil information providing server device 11 acquires reference fuel oil price data by receiving the data from reference fuel oil price data providing server device 12. Methods for reference fuel oil price data acquisition unit 111 to acquire reference fuel oil price data is not limited thereto, and another configuration such as reference fuel oil price data acquisition unit 111 acquiring reference fuel oil price data input by an employee or the like of an operator that uses fuel oil information providing system 1, for example, may be adopted.

(3) In the embodiment described above, fuel oil information providing server device 11, reference fuel oil price data providing server device 12, terminal device 13 and terminal device 14 are all configured as different devices. A configuration in which two or more of these devices are incorporated into the same device may be adopted. For example, fuel oil information providing server device 11 and reference fuel oil price data providing server device 12 may be configured as one device, or fuel oil information providing server device 11 and terminal device 13 may be configured as one device.

(4) In the embodiment described above, the fuel oil information supplying screen displays information on bunkering locations at which a ship is able to call from the sailing route in addition to bunkering locations on the sailing route. These bunkering locations at which calling is possible are bunkering locations indicated by sailing route data (FIG. 8) prepared in advance for each sailing route. Methods for specifying bunkering locations that are not ports of call for which information is displayed on the fuel oil information supplying screen per se are not limited to methods according to data such as sailing route data prepared in advance, and a configuration of specifying locations from the geographical relationship between a sailing route and bunkering locations or the like may be adopted.

In the present modified example, memory 102 of fuel oil information providing server device 11 stores bunkering location position data indicating the positions (for example, coordinates) of a plurality of bunkering locations (including ports of call), for example. Fuel oil information providing server device 11 is provided with, as a functional component, a bunkering location position data acquisition unit that reads bunkering location position data for a plurality of bunkering locations from memory 102, for example. Further, Fuel oil information providing server device 11 is provided with, as a functional component, a bunkering location position data acquisition unit that specifies bunkering locations at which ship 9 is able to call during voyage in accordance with conditions set in advance such as within a predetermined distance from the sailing route, on the basis of bunkering location position data for a plurality of bunkering locations acquired by bunkering location position data acquisition unit. Display instruction data generation unit 122 generates display instruction data for displaying, on a fuel oil information supplying screen, information on fuel oil price and the like related to bunkering locations at which calling is possible specified by a bunkering location specification unit, in place of the bunkering locations at which calling is possible indicated by sailing route data (FIG. 8).

In the present modified example, the bunkering locations for which information is displayed on the fuel oil information supplying screen are not limited by the condition of being within a predetermined distance from the sailing route. For example, another condition of using the geographical relationship between the sailing route and the bunkering locations such as the sailing distance that increases when calling when within a predetermined distance may be adopted, and in addition to the condition of using the geographical relationship, a condition that uses parameters other than the geographical relationship such as fuel oil price being less expensive than at neighboring bunkering locations on the sailing route may be adopted as a condition for selecting bunkering locations for which information is displayed.

(5) In the embodiment described above, the configuration of various types of data illustrated in FIG. 4 and the like is merely one specific example, and another configuration may be adopted. For example, in the correction conditions database exemplified in FIG. 5, it is assumed that it is possible to purchase the same type of fuel oil at the same bunkering location from a plurality of suppliers to which different conditions apply, and a supplier category is provided, but if one supplier is determined as the supplier from which to purchase fuel oil at each bunkering location, it is not necessary to have a supplier category in the correction conditions database.

(6) In the embodiment described above, the layout of the fuel oil information supplying screen illustrated in FIGS. 11-18 and 25 or type and format of information displayed on the fuel oil information supplying screen is merely one specific example, and various layouts and type/format of displayed information may be adopted. For example, in the drawing exemplified in FIG. 15, 16 or 25, a configuration of displaying the current position of the ship or the remaining oil amount may be adopted. Further, for example, in the drawing exemplified in FIG. 15, 16 or 25, modifications of display mode for providing more intuitive information to a user, such as highlighting in red information (window) on ports specified as standard bunkering locations by bunkering plan data (FIG. 9) may be added.

(7) On the fuel oil information supplying screen, a configuration of displaying the cost when purchasing only an amount of fuel oil specified by a user may be adopted. In the present modified example, display instruction data request acquisition unit 115 of fuel oil information providing server device 11 is provided with a bunkering amount data acquisition unit that acquires bunkering amount data indicating the bunkering amounts at bunkering locations specified by a user of terminal device 13 or terminal device 14. Further, fuel oil information providing server device 11 is provided with a price calculation unit that calculates the purchase price of an amount of bunkering fuel oil indicated by bunkering amount data.

FIG. 26 is a drawing exemplifying fuel oil price data stored in fuel oil price data storage unit 114 in the present modified example. The fuel oil price data exemplified in FIG. 26 is data generated by fuel oil price data generation unit 113 in accordance with correction conditions data on the basis of reference fuel oil price data (FIG. 4), and indicates the price of fuel oil that changes according to the bunkering amount.

In the present modified example, if a user of terminal device 13 or terminal device 14 specifies a bunkering location displayed on the map in region A04 on the fuel oil information supplying screen by clicking or the like, a box for inputting a bunkering amount is displayed. If a user inputs a bunkering amount into this box, terminal device 13 or terminal device 14 sends, to fuel oil information providing server device 11, request data including bunkering location name data indicating the bunkering location name of the bunkering location specified by the user by clicking or the like, and bunkering amount data indicating the bunkering amount input by the user.

Bunkering amount data acquisition unit acquires bunkering location name data and bunkering amount data included in the request data sent from terminal device 13 or terminal device 14, and delivers the data to the price calculation unit. The price calculation unit calculates the cost of purchasing fuel oil in a bunkering amount input by a user on the basis of fuel oil price data (FIG. 26) and bunkering location name data and bunkering amount data received from the bunkering amount data acquisition unit. Display instruction data generation unit 122 generates display instruction data for displaying the calculated cost on the fuel oil information supplying screen, and delivers the data to display instruction data output unit 121. As a result, the fuel oil information supplying screen displays the cost of purchasing the fuel oil.

(8) In the embodiment described above, fuel oil information providing server device 11, reference fuel oil price data providing server device 12, terminal device 13 and terminal device 14 that constitute fuel oil information providing system 1 each have a configuration of being realized by having a general computer execute processes according to application programs. In place thereof, one or more of these devices may be configured as a so-called dedicated device.

The present invention is realized as each of: a data-processing device exemplified by fuel oil information providing server device 11 (or fuel oil information providing server device 21); a program for having a computer function as the data-processing device; a computer-readable recording medium that continuously records the program; and a method for processing executed by the data-processing device.

DESCRIPTION OF REFERENCE NUMERALS

1 . . . fuel oil information providing system, 2 . . . fuel oil information providing system, 8 . . . communication satellite, 9 . . . ship, 10 . . . computer, 11 . . . fuel oil information providing server device, 12 . . . reference fuel oil price data providing server device, 13 . . . terminal device, 14 . . . terminal device, 21 . . . fuel oil information providing server device, 25 . . . weather and marine information providing server device, 101 . . . processor, 102 . . . memory, 103 . . . communication interface, 104 . . . input/output interface, 109 . . . bus, 111 . . . reference fuel oil price data acquisition unit, 112 . . . correction conditions data acquisition unit, 113 . . . fuel oil price data generation unit, 114 . . . fuel oil price data storage unit, 115 . . . display instruction data request acquisition unit, 116 . . . fuel oil price data acquisition unit, 117 . . . bunkering plan data acquisition unit, 118 . . . remaining oil amount data acquisition unit, 119 . . . current position data acquisition unit, 120 . . . rule data acquisition unit, 121 . . . display instruction data output unit, 122 . . . display instruction data generation unit, 211 . . . weather and marine data acquisition unit

What is claimed is:

1. A data processing device comprising:
   a terminal device that is operated to manage from land operations of a plurality of ships;
   a fuel oil information providing server device that communicates with the terminal device, the fuel oil information providing server device including:
   a sailing route identification data acquisition unit that acquires sailing route identification data identifying a sailing route specified by a user;
   a fuel oil price data acquisition unit that acquires, for each of one or more bunkering locations at which supplying of fuel oil is possible, fuel oil price data indicating fuel oil prices at bunkering locations;
   a display instruction data generation unit that generates display instruction data for instructing display of fuel oil prices at each of one or more bunkering locations indicated by the fuel oil price data; and
   a display instruction data output unit that outputs the display instruction data to a display device at the terminal device.

2. The data processing device according to claim 1, comprising:
   a reference fuel oil price data acquisition unit that acquires, for each of the one or more bunkering locations, reference fuel oil price data indicating a fuel oil price that serves as a reference at the bunkering locations;
   a correction conditions data acquisition unit that acquires, for at least one of the one or more bunkering locations, correction conditions data indicating conditions for correcting the fuel oil prices that serve as a reference at the bunkering locations to actual fuel oil prices; and
   a fuel oil price data generation unit that generates fuel oil price data indicating fuel oil prices specified by correcting the fuel oil prices indicated by the reference fuel oil price data in accordance with the corrections conditions indicated by the correction conditions data;
   wherein:
   the fuel oil price data acquisition unit acquires fuel oil price data generated by the fuel oil price data generation unit.

3. The data processing device according to claim 1, comprising:
   a price determination rule data acquisition unit that acquires, for at least one bunkering location from among the one or more bunkering locations, price determination rule data indicating determination rules for actual fuel oil prices at the bunkering locations;
   wherein:
   the display instruction data generation unit generates display instruction data that instructs display of determination rules for actual fuel oil price indicated by the price determination rule data.

4. The data processing device according to claim 1, comprising:
   a bunkering plan data acquisition unit that acquires, for at least one bunkering location from among the one or more bunkering locations, bunkering plan data indicating determination rules for a bunkering amount of fuel oil at the bunkering locations;
   wherein:
   the display instruction data generation unit generates display instruction data that instructs display of determination rules for a bunkering amount indicated by the bunkering plan data.

5. The data processing device according to claim 1, wherein
   the fuel oil price data acquisition unit acquires, in addition to fuel oil prices at bunkering locations positioned on the sailing route, fuel oil price data indicating fuel oil prices at bunkering locations at which a ship that traverses the sailing route is able to call during a voyage, and the display instruction data generation unit, in addition to fuel oil prices at bunkering locations positioned on the sailing route, generates display instruction data that instructs display of fuel oil prices at bunkering locations at which a ship that traverses the sailing route is able to call during the voyage.

6. The data processing device according to claim 5, comprising:
a bunkering location position data acquisition unit that acquires bunkering location position data indicating positions of a plurality of bunkering locations; and
a bunkering location specification unit that specifies, on the basis of the bunkering location position data, bunkering locations that are not positioned on the sailing route and at which a ship that traverses the sailing route is able to call during the voyage;
wherein:
the fuel oil price data acquisition unit acquires fuel oil price data indicating fuel oil prices at the bunkering locations specified by the bunkering location specification unit at which a ship that traverses the sailing route is able to call during the voyage.

7. The data processing device according to claim 1, comprising:
a fuel oil price data storage unit that stores fuel oil price data acquired by the fuel oil price data acquisition unit in association with time and date data indicating time and date at which fuel oil were sold at fuel oil prices indicated by the fuel oil price data;
wherein:
the display instruction data generation unit generates display instruction data that instructs display of time-series variations in fuel oil prices at bunkering locations positioned on the sailing route indicated by a plurality of pairs of fuel oil price data and time and date data stored by the fuel oil price data storage unit.

8. The data processing device according to claim 1, comprising:
a remaining oil amount data acquisition unit that acquiring, for each of one or more fuel oil tanks provided on a ship that traverses the sailing route, remaining oil amount data indicating a currently remaining fuel oil amount stored in the fuel oil tank;
wherein:
the display instruction data generation unit generates display instruction data that instructs display of a remaining oil amount indicated by the remaining oil amount data.

9. The data processing device according to claim 1, comprising:
a current position data acquisition unit that acquires current position data indicating a current position of a ship that traverses the sailing route;
wherein:
the display instruction data generation unit generates display instruction data that instructs display of a position indicated by the current position data.

10. The data processing device according to claim 1, comprising:
a weather and marine data acquisition unit that acquires weather and marine data indicating weather and/or marine conditions encountered by a ship that traverses the sailing route;
wherein:
the display instruction data generation unit generates display instruction data that instructs display of weather and/or marine conditions indicated by the weather and marine data.

11. The data processing device according to claim 1, comprising:
a bunkering amount data acquisition unit that acquires bunkering amount data indicating a bunkering amount specified by a user for one of the bunkering locations for which fuel oil price data is acquired by the fuel oil price data acquisition unit; and
a price calculation unit that calculates, on the basis of the fuel oil price data and the bunkering amount data for the one of the bunkering locations, a purchase price of fuel oil for a bunkering amount indicated by the bunkering amount data for the one of the bunkering locations;
wherein:
the display instruction data generation unit generates display instruction data that instructs display of the purchase price.

12. The data processing device according to claim 1, comprising:
a per-route formulation rule data acquisition unit that acquires per-route formulation rule data indicating rules on formulating a bunkering plan for a sailing route identified by the sailing route identification data;
wherein:
the display instruction data generation unit generates display instruction data that instructs display of rules indicated by the per-route formulation rule data.

13. The data processing device according to claim 1, comprising:
a per-port formulation rule data acquisition unit that acquires, for each of at least one of one or more bunkering locations positioned on a sailing route identified by the sailing route identification data, per-port formulation rule data indicating rules for formulating a bunkering plan;
wherein:
the display instruction data generation unit generates display instruction data that instructs display of rules indicated by the per-port formulation rule data.

14. The data processing device according to claim 1, comprising:
a ship identification data acquisition unit that acquires ship identification data identifying a ship specified by a user; and
a per-ship formulation rule data acquisition unit that acquires, for a ship identified by the ship identification data, per-ship formulation rule data indicating rules for formulating a bunkering plan;
wherein:
the display instruction data generation unit generates display instruction data that instructs display of rules indicated by the per-ship formulation rule data.

15. A program stored on a non-transitory computer readable medium for causing a computer to execute:
a process for acquiring sailing route identification data by a fuel oil information providing server device, the sailing route identification data identifying a sailing route specified by a user, the fuel oil information providing server device communicating with a terminal device that is operated to manage from land operations of a plurality of ships;
a process for acquiring by the fuel oil information providing server device, for each of one or more bunkering locations at which supplying of fuel oil is possible, fuel oil price data indicating fuel oil prices at bunkering locations;

a process for generating display instruction data by the fuel oil information providing server device, the display instruction data instructing display of fuel oil prices at each of one or more bunkering locations indicated by the fuel oil price data; and a process for outputting the display instruction data to a display device at the terminal device.

16. A computer-readable recording medium that continuously records a program for causing a computer to execute:

a process for acquiring sailing route identification data by a fuel oil information providing server device, the sailing route identification data identifying a sailing route specified by a user, the fuel oil information providing server device communicating with a terminal device that is operated to manage from land operations of a plurality of ships;

a process for acquiring by the fuel oil information providing server device, for each of one or more bunkering locations at which supplying of fuel oil is possible, fuel oil price data indicating fuel oil prices at bunkering locations;

a process for generating display instruction data by the fuel oil information providing server device, the display instruction data instructing display of fuel oil prices at each of one or more bunkering locations indicated by the fuel oil price data; and a process for outputting the display instruction data by the fuel oil information providing server device to a display device at the terminal.

17. A data processing method comprising:

a step in which a fuel oil information providing server device acquires sailing route identification data identifying a sailing route specified by a user, the fuel oil information providing server device communicating with a terminal device that is operated to manage from land operations of a plurality of ships;

a step in which the fuel oil information providing server device acquires, for each of one or more bunkering locations at which supplying of fuel oil is possible, fuel oil price data indicating fuel oil prices at bunkering locations;

a step in which the fuel oil information providing server device generates display instruction data for instructing display of fuel oil prices at each of one or more bunkering locations indicated by the fuel oil price data; and a step in which the fuel oil information providing server device outputs the display instruction data to a display device at the terminal.

* * * * *